United States Patent
Yeo et al.

(10) Patent No.: US 12,047,948 B2
(45) Date of Patent: Jul. 23, 2024

(54) METHOD AND DEVICE FOR TRANSMITTING AND RECEIVING DATA BASED ON SCHEDULING RESTRICTION CONDITION

(71) Applicant: Samsung Electronics Co., Ltd., Suwon-si (KR)

(72) Inventors: Jeongho Yeo, Suwon-si (KR); Suha Yoon, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 17/310,575

(22) PCT Filed: Feb. 13, 2020

(86) PCT No.: PCT/KR2020/002032
§ 371 (c)(1),
(2) Date: Aug. 11, 2021

(87) PCT Pub. No.: WO2020/166993
PCT Pub. Date: Aug. 20, 2020

(65) Prior Publication Data
US 2022/0070898 A1  Mar. 3, 2022

(30) Foreign Application Priority Data
Feb. 13, 2019  (KR) .................. 10-2019-0016934

(51) Int. Cl.
*H04W 72/1273* (2023.01)
*H04L 1/08* (2006.01)
(Continued)

(52) U.S. Cl.
CPC .......... *H04W 72/1273* (2013.01); *H04L 1/08* (2013.01); *H04W 24/08* (2013.01); *H04W 72/23* (2023.01)

(58) Field of Classification Search
CPC . H04W 72/1273; H04W 24/08; H04W 72/23; H04W 72/535; H04W 72/50;
(Continued)

(56) References Cited

U.S. PATENT DOCUMENTS 9,560,660 B1     1/2017 Oroskar et al.
9,949,248 B2 *   4/2018 Barbieri et al. .... H04W 72/042
(Continued)

FOREIGN PATENT DOCUMENTS

EP    3 036 855 B1 *   4/2019  ............ H04W 72/04
EP    3565343 A1      11/2019
(Continued)

OTHER PUBLICATIONS

Park Sung Jun et al. (KR 20090031317 A) >>> Method of Restricting a Scheduling Request for Effective Data Transmission (see title). (Year: 2009).*
(Continued)

*Primary Examiner* — Meless N Zewdu

(57) ABSTRACT

The present disclosure relates to a communication technique for combining IoT technology with a 5G communication system for supporting a higher data transmission rate than 4G systems; and a system therefor. The present disclosure can be applied to intelligent services (e.g., smart home, smart building, smart city, smart car or connected car, healthcare, digital education, retail, security- and safety-related services, etc.) on the basis of 5G communication technology and IoT-related technology. The method for a terminal in a wireless communication system, according to the present disclosure, comprises the steps of: monitoring a
(Continued)

physical downlink control channel (PDCCH); identifying, basis on downlink control information (DCI) decoded as result of the monitoring, whether to determine for a scheduling restriction condition; identifying whether a physical downlink shared channel (PDSCH) scheduled by the DCI satisfies the scheduling restriction condition, in case that determining for the scheduling restriction condition is necessary; and receiving, from a base station, data via the PDSCH, in case that the scheduling restriction condition is satisfied. The present disclosure relates to a method and device for transmitting and receiving a signal in a wireless communication system. The method, according to one embodiment of the present disclosure, may determine a peak data rate supportable by a terminal, compare the peak data rate and an actual data rate determined from scheduling information, and transmit a signal according to the scheduling information on the basis of the result of the comparison.

14 Claims, 19 Drawing Sheets

(51) Int. Cl.
    *H04W 24/08* (2009.01)
    *H04W 72/23* (2023.01)
(58) Field of Classification Search
    CPC ..... H04W 72/12; H04W 24/10; H04W 24/00; H04W 28/02; H04W 28/0205; H04W 28/08; H04W 48/00; H04W 48/02; H04W 48/12; H04W 48/08; H04W 72/1263; H04W 72/20; H04W 74/00; H04W 74/002; H04W 74/006; H04W 88/00; H04W 88/02; H04W 88/08; H04W 88/18; H04W 48/10; H04W 72/232; H04W 72/231; H04L 1/08; H04L 1/0003; H04L 1/0016; H04L 5/0055; H04L 5/0053; H04L 5/0064; H04L 1/005; H04L 5/00; H04L 1/00; H04L 1/18; H04L 1/1001
    See application file for complete search history.

(56) References Cited

U.S. PATENT DOCUMENTS

| | | | |
|---|---|---|---|
| 10,200,185 B2 | 2/2019 | You et al. | |
| 10,368,363 B2 | 7/2019 | Park et al. | |
| 10,412,720 B2 | 9/2019 | Kim et al. | |
| 10,873,377 B2* | 12/2020 | Cheng et al. | H04B 7/0617 |
| 2011/0312319 A1* | 12/2011 | Lindoff et al. | 455/423 |
| 2013/0272121 A1 | 10/2013 | Stanwood et al. | |
| 2014/0169297 A1 | 6/2014 | Kim et al. | |
| 2015/0085689 A1* | 3/2015 | Vos | H04W 74/004 |
| 2016/0057776 A1* | 2/2016 | Farkas et al. | H04W 72/1294 |
| 2017/0207884 A1 | 7/2017 | Jiang et al. | |
| 2017/0215202 A1* | 7/2017 | Yang et al. | H04W 72/1278 |
| 2018/0317207 A1* | 11/2018 | Liao et al. | H04W 72/042 |
| 2018/0343154 A1* | 11/2018 | Park et al. | H04L 27/2613 |
| 2019/0349971 A1 | 11/2019 | Yu et al. | |

FOREIGN PATENT DOCUMENTS

| | | | |
|---|---|---|---|
| EP | 3793248 | A1 | 3/2021 |
| KR | 10-2019-0129662 | A | 11/2019 |
| KR | 10-2019-0129667 | A | 11/2019 |
| WO | 2013070035 | A1 | 5/2013 |
| WO | 2015130005 | A1 | 9/2015 |
| WO | 2016167623 | A1 | 10/2016 |
| WO | 2018133102 | A1 | 7/2018 |

OTHER PUBLICATIONS

Zhong (CN 102595604 A) >>> Method And System For Transmitting Control Information to Base Station Terminal (see title and abstract). (Year: 2012).*
International Search Report and Written Opinion of the International Searching Authority dated May 19, 2020 in connection with International Application No. PCT/KR2020/002032, 9 pages.
Ericsson, "Maintenance issues of DL/UL data scheduling and HARQ procedure," R1-1809407, 3GPP TSG RAN WG1 Meeting #94, Gothenburg, Sweden, Aug. 20-24, 2018, 19 pages.
3GPP TS 38.212 V16.2.0 (Jun. 2020), Technical Specification, 3rd Generation Partnership Project; Technical Specification Group Radio Access Network; NR; Multiplexing and channel coding (Release 16), Jun. 2020, 151 pages.
3GPP TS 38.306 V15.7.0 (Sep. 2019), Technical Specification, 3rd Generation Partnership Project; Technical Specification Group Radio Access Network; NR; User Equipment (UE) radio access capabilities (Release 15), Sep. 2019, 55 pages.
Supplementary European Search Report dated Feb. 28, 2022, in connection with European Application No. 20755604.4, 13 pages.
Office Action dated Mar. 28, 2024, in connection with Korean Patent Application No. 10-2019-0016934, 9 pages.
Vivo, "Discussion on pre-emption indication for downlink", R1-1710382, 3GPP TSG RAN WG1 NR Ad-Hoc#2, Qingdao, P.R. China, Jun. 27-30, 2017, 3 pages.
MediaTek Inc., "Remaining issues on pre-emption indication", R1-1804083, 3GPP TSG RAN WG1 #92bis, Sanya, China, Apr. 16-20, 2018, 11 pages.

* cited by examiner

METHOD AND DEVICE FOR TRANSMITTING AND RECEIVING DATA BASED ON SCHEDULING RESTRICTION CONDITION

CROSS-REFERENCE TO RELATED APPLICATIONS

This application is a 371 National Stage of International Application No. PCT/KR2020/002032, filed Feb. 13, 2020, which claims priority to Korean Patent Application No. 10-2019-0016934, filed Feb. 13, 2019, the disclosures of which are herein incorporated by reference in their entirety.

BACKGROUND

1. Field

The disclosure relates to a communication system, and more particularly, to a method and device for scheduling and transmitting/receiving data according to a data amount or data rate that a terminal can process.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

As various services can be provided thanks to the development of wireless communication systems as described above, there is a need for a method of smoothly providing such services.

SUMMARY

In a wireless communication system, particularly, in an NR system, a data rate that a terminal can support may be predetermined between a base station and the terminal. This may be calculated using the maximum frequency band, the maximum modulation order, the maximum number of layers, and the like supported by the terminal. The base station may schedule the amount of data corresponding to an instantaneous data rate higher than the calculated data rate to the terminal. In addition, depending on a method of calculating the instantaneous data rate, the scheduling of the base station and the data transmission/reception operation of the terminal may vary.

Therefore, restrictions on the scheduling of the base station may increase, which may result in a case where the terminal cannot process data. In order to minimize this case, it is necessary to define the operations of the base station and the terminal in accordance with the data rate and scheduling information.

According to the disclosure for solving the above problems, a method of a terminal in a wireless communication system includes monitoring a physical downlink control channel (PDCCH), identifying whether to determine for a scheduling restriction condition, based on downlink control information (DCI) decoded as a result of the monitoring, in case that determining for the scheduling restriction condition is necessary, identifying whether a physical downlink shared channel (PDSCH) scheduled through the DCI satisfies the scheduling restriction condition, and in case that the scheduling restriction condition is satisfied, receiving data from a base station through the PDSCH.

According to the disclosure for solving the above problems, a terminal includes a transceiver and a controller configured to monitor a physical downlink control channel (PDCCH), to identify whether to determine for a scheduling restriction condition, based on downlink control information (DCI) decoded as a result of the monitoring, to, in case that determining for the scheduling restriction condition is necessary, identify whether a physical downlink shared channel (PDSCH) scheduled through the DCI satisfies the scheduling restriction condition, and to, in case that the scheduling restriction condition is satisfied, receive data from a base station through the PDSCH.

According to the disclosure, the base station provides a method and device for scheduling so as not to exceed the maximum data rate supported by the terminal, and it is possible to efficiently transmit and receive data between the base station and the terminal.

DETAILED DESCRIPTION

Figure 1:
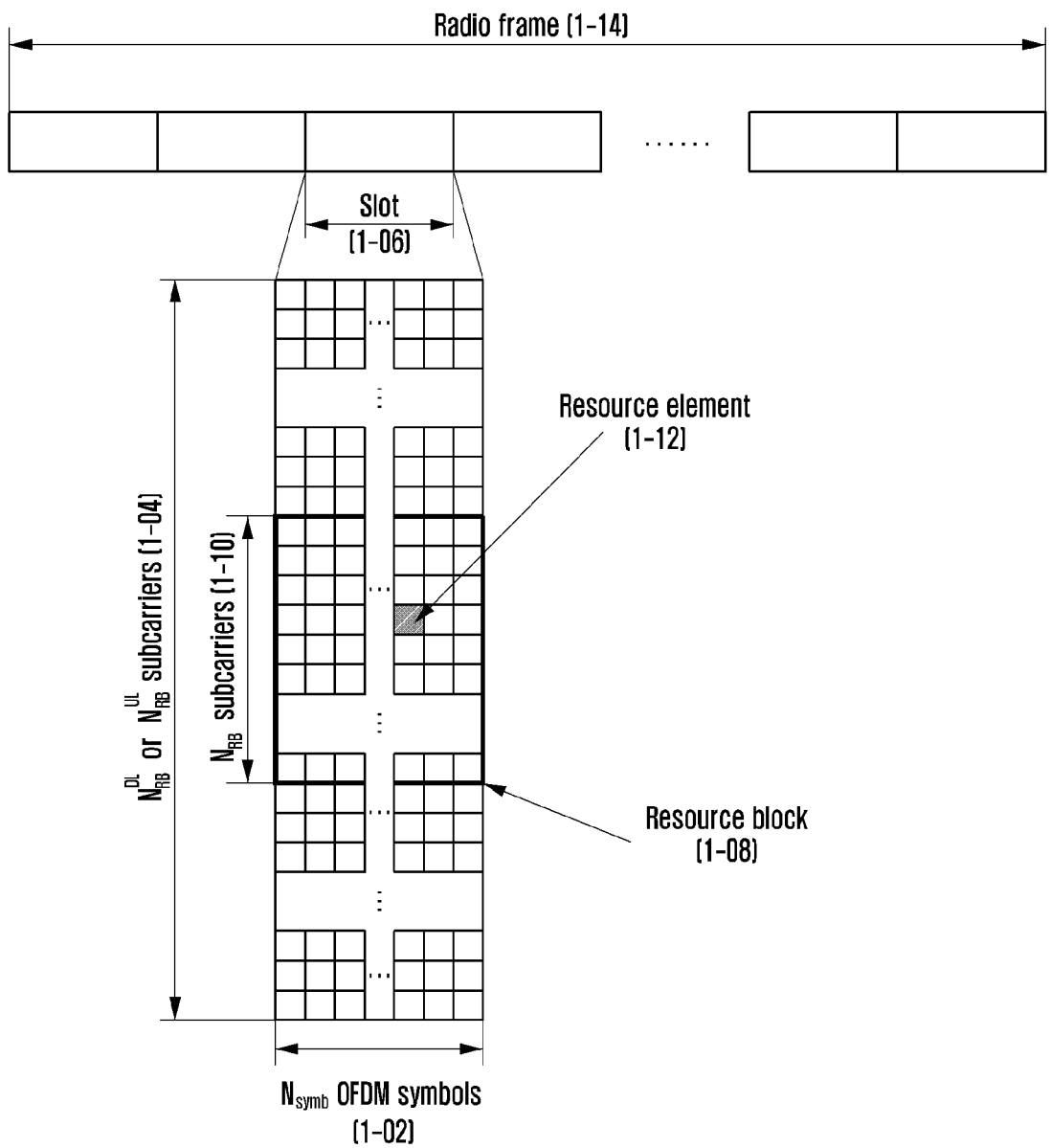
FIG. 1 is a diagram illustrating a basic structure of a time-frequency domain which is a radio resource domain in which the data or control channel is transmitted in downlink or uplink of an NR system.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

Meanwhile, New Radio access technology (NR), which is a new 5G communication, is being designed to allow various services to be freely multiplexed in time and frequency resources, and thus waveform/numerology, reference signals, etc. may be dynamically or freely allocated according to needs of the corresponding service. In order to provide an optimal service to a terminal in wireless communication, it is important to optimize data transmission through measurement of channel quality and interference, and it is essential to measure an accurate channel state. However, unlike 4G communication where channel and interference characteristics do not change significantly depending on frequency resources, 5G channel is subject to a great change in the channel and interference characteristics depending on the service, so it is necessary to support a subset of frequency resource group (FRG) dimension for measuring them separately. Meanwhile, in the NR system, the types of supported services may be divided into categories such as enhanced mobile broadband (eMBB), massive machine type communications (mMTC), and ultra-reliable and low-latency communications (URLLC). The eMBB is a service that aims for a high-speed transmission of high-capacity data, the mMTC is a service that aims for terminal power minimization and connectivity of multiple terminals, and the URLLC is a service that aims for high reliability and low latency. Depending on the type of service applied to the terminal, different requirements may be applied.

Meanwhile, as research on the next-generation communication system progresses, various methods for scheduling communication with a terminal are being discussed. In this regard, there is a need for an efficient scheduling and data transmission/reception method in consideration of the characteristics of the next-generation communication system.

As such, a plurality of services may be provided to a user in the communication system, and a method and device for providing respective services within the same time section in accordance with their characteristics may be required.

Hereinafter, embodiments of the disclosure will be described in detail with reference to the accompanying drawings.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, the unit may include one or more processors.

Outgrowing what provides an initial voice-oriented service, a wireless communication system is evolving to a broadband wireless communication system that provides a high-speed and high-quality packet data service, like communication standards such as, for example, 3GPP high speed packet access (HSPA), long term evolution (LTE) (or evolved universal terrestrial radio access (E-UTRA)), LTE-advanced (LTE-A), high rate packet data (HRPD) of 3GPP2, ultra-mobile broadband (UMB), and 802.16e of IEEE. In addition, a 5G or new radio (NR) communication standard is being made as a 5G wireless communication system.

As a representative example of the broadband wireless communication system, an NR system employs an orthogonal frequency division multiplexing (OFDM) scheme in a downlink (DL) and an uplink (UL). Specifically, a cyclic-prefix OFDM (CP-OFDM) scheme is employed in the downlink, and a discrete Fourier transform spreading OFDM (DFT-S-OFDM) scheme is employed together with the CP-OFDM in the uplink. The uplink refers to a radio link in which a terminal (user equipment (UE) or mobile station (MS)) transmits data or control signals to a base station (BS) (or gNode B), and the downlink refers to a radio link in which the base station transmits data or control signals to the terminal. This multiple access scheme generally allocates and operates time-frequency resources for carrying data or control information to be not overlapped for each user (that is, orthogonality is established), so that each user's data or control information can be distinguished.

The NR system employs a hybrid automatic repeat request (HARD) scheme for retransmitting corresponding data in a physical layer when a decoding failure occurs in the initial transmission. In the HARQ scheme, when failing to correctly decode data, a receiver sends information (negative acknowledgment: NACK) indicating a decoding failure to a transmitter so that the transmitter can retransmit the data in the physical layer. The receiver may improve data reception performance by combining data retransmitted by the transmitter with data that has previously failed to be decoded. In addition, when correctly decoding data, the receiver sends information (acknowledgement: ACK) indicating a decoding success to the transmitter so that the transmitter can transmit new data.

FIG. 1 is a diagram illustrating a basic structure of a time-frequency domain which is a radio resource domain in which the data or control channel is transmitted in downlink or uplink of an NR system.

In FIG. 1, the horizontal axis represents the time domain, and the vertical axis represents the frequency domain. The minimum transmission unit in the time domain is an OFDM symbol, and Nsymb OFDM symbols 1-02 may constitute one slot 1-06. The length of a subframe may be defined as 1.0 ms, and a radio frame 1-14 may be defined as 10 ms. The minimum transmission unit in the frequency domain is a subcarrier, and the bandwidth of the entire system transmission bandwidth may be composed of $N_{RB}^{DL}$ or $R_{RB}^{UL}$ subcarriers 1-04.

A basic unit of a resource in the time-frequency domain is a resource element (RE) 1-12, which may be represented by an OFDM symbol index and a subcarrier index. A resource block (RB) 1-08 or physical resource block (PRB) may be defined as Nsymb consecutive OFDM symbols 1-02 in the time domain and NRB consecutive subcarriers 1-10 in the frequency domain. Therefore, one RB 1-08 may be composed of Nsymb×NRB number of REs. In general, the minimum transmission unit of data is an RB unit. In the NR system, Nsymb is 14, NRB is 12, and $N_{RB}^{DL}$, $N_{RB}^{UL}$, and NRB are proportional to the bandwidth of the system transmission band. Also, the data rate may increase in proportion to the number of RBs scheduled for the terminal.

In the NR system, in case of the FDD system that divides the downlink and the uplink by frequency, a downlink transmission bandwidth and an uplink transmission bandwidth may be different from each other. A channel bandwidth represents an RF bandwidth corresponding to a system transmission bandwidth. Table 1 shows the correspondence between the system transmission bandwidth and the channel bandwidth defined in the LTE system, which is the 4th generation wireless communication before the NR system. For example, the LTE system having a 10 MHz channel bandwidth may be configured with a transmission bandwidth of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The NR system may operate in a channel bandwidth wider than that of LTE shown in Table 1.

The bandwidth of the NR system may have the configuration shown in Tables 2 and 3.

TABLE 2

| Configuration of Frequency Range 1 (FR1) | | | | | | | | | | | | |
|---|---|---|---|---|---|---|---|---|---|---|---|---|
| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

| Configuration of Frequency Range 2 (FR2) | | | | |
|---|---|---|---|---|
| SCS(kHz) | 50 MHz $N_{RB}$ | 100 MHz $N_{RB}$ | 200 MHz $N_{RB}$ | 400 MHz $N_{RB}$ |
| 60 | 66 | 132 | 264 | N.A |
| 120 | 32 | 66 | 132 | 264 |

In the NR system, the frequency range may be divided into FR1 and FR2 and defined as follows.

| Frequency range designation | Corresponding frequency range |
|---|---|
| FR1 | 450 MHz-6000 MHz |
| FR2 | 24250 MHz-52600 MHz |

The above FR1 and FR2 may be changed and applied differently. For example, the frequency range of FR1 may be changed and applied as being from 450 MHz to 7125 MHz.

In the LTE system, scheduling information for downlink data or uplink data may be sent from the base station to the terminal through downlink control information (DCI). The DCI is defined according to various formats, and each format may indicate whether it is scheduling information (UL grant) for uplink data or scheduling information (DL grant) for downlink data, whether it is a compact DCI with a small size of control information, whether spatial multiplexing using multiple antennas is applied, whether it is DCI for power control, and the like. For example, DCI format 1-1, which is scheduling control information (DL grant) for downlink data, may include at least one of the following types of control information.

Carrier indicator: This indicates a frequency carrier where transmission is performed.

DCI format indicator: This is an indicator for distinguishing whether the corresponding DCI is for downlink or uplink.

Bandwidth part (BWP) indicator: This indicates a BWP where transmission is performed.

Frequency domain resource allocation: This indicates an RB in the frequency domain allocated for data transmission. A resource to be expressed is determined according to the system bandwidth and the resource allocation scheme.

Time domain resource allocation: This indicates an OFDM symbol in a slot to be used for transmission of a data-related channel.

VRB-to-PRB mapping: This indicates a mapping scheme between a virtual RB (VRB) index and a physical RB (PRB) index.

Modulation and coding scheme (MCS): This indicates a modulation scheme and a coding rate used for data transmission. That is, this may indicate information about QPSK, 16QAM, 64QAM, or 256QAM, and a coding rate value that informs a transport block size (TBS) and channel coding information.

Code block group (CBG) transmission information: This indicates information about a CBG transmitted when CBG retransmission is configured.

HARQ process number: This indicates the process number of HARQ.

PUSCH is mapped. Here, S may be a relative position from the start of the slot, L may be the number of consecutive symbols, and S and L may be determined from a start and length indicator value (SLIV) defined as follows.

if $(L-1) \leq 7$ then $$SLIV = 14 \cdot (L-1) + S$$

else $$SLIV14 \cdot (14-L+1)+(14-1-S)$$

where $0 \leq L \leq 14-S$

In the NR system, generally through RRC configuration, information (e.g., in the form of a table) that includes, in one row, information about a SLIV value, PDSCH and PUSCH mapping types, and slots for PDSCH and PUSCH transmission may be configured. Then, in time domain resource allocation of DCI, an index value in the configured table is indicated so that the base station can transmit to the terminal the information about a SLIV value, PDSCH and PUSCH mapping types, and slots for PDSCH and PUSCH transmission.

In the NR system, the PUSCH mapping type may be defined as type A and type B. In PUSCH mapping type A, the first symbol among DMRS symbols may be located in the second or third OFDM symbol in the slot. In the PUSCH mapping type B, the first symbol among DMRS symbols may be located in the first OFDM symbol in the time domain resource allocated for PUSCH transmission.

In the NR system, the PDSCH mapping type may be defined as type A and type B. The first symbol among DMRS symbols may be located in the first symbol of the PDSCH.

Tables 4 and 5 show combinations of S and L supported for each type of PDSCH and PUSCH.

TABLE 4

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14) | (3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

TABLE 5

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

New data indicator: This indicates whether HARQ initial transmission or retransmission.

Redundancy version: This indicates a redundancy version of HARQ.

Transmit power control (TPC) command for physical uplink control channel (PUCCH): This indicates a transmit power control command for PUCCH, which is an uplink control channel.

In case of PUSCH transmission, time domain resource assignment may be transmitted by information about a slot for PUSCH transmission, a start symbol position S in the corresponding slot, and the number of symbols L to which The DCI may be transmitted on a physical downlink control channel (PDCCH) (or control information, hereinafter used interchangeably) after a channel coding and modulation process.

In general, the DCI may be scrambled with a specific radio network temporary identifier (RNTI) (or terminal identifier) independently for each terminal, add a cyclic redundancy check (CRC), be channel-coded, and be configured with independent each PDCCH, and be transmitted. The PDCCH may be mapped and transmitted in a control resource set (CORESET) configured for the terminal.

Downlink data may be transmitted on a physical downlink shared channel (PDSCH), which is a physical channel for downlink data transmission. The PDSCH may be transmitted after a control channel transmission section, and scheduling information such as a specific mapping position in the frequency domain and a modulation scheme may be determined based on the DCI transmitted through the PDCCH.

Through the MCS among control information types constituting the DCI, the base station may notify the terminal of a modulation scheme applied to the PDSCH to be transmitted and the size (TBS) of data to be transmitted. According to an embodiment, the MCS may consist of 5 bits or more or fewer bits. The TBS corresponds to the size before the channel coding for error correction is applied to data (transport block: TB) to be transmitted by the base station.

In the disclosure, the transport block (TB) may include a medium access control (MAC) header, a MAC control element (CE), one or more MAC service data units (SDUs), and padding bits. According to another example, the TB may indicate a data unit or MAC protocol data unit (PDU) that is sent from the MAC layer to the physical layer.

The modulation schemes supported in the NR system are quadrature phase shift keying (QPSK), 16 quadrature amplitude modulation (16QAM), 64QAM, and 256QAM, and each modulation order (Qm) corresponds to 2, 4, 6, or 8. That is, 2 bits per symbol may be transmitted in case of QPSK modulation, 4 bits per symbol in case of 16QAM modulation, 6 bits per symbol in case of 64QAM modulation, and 8 bits per symbol in case of 256QAM modulation.

Figure 2:
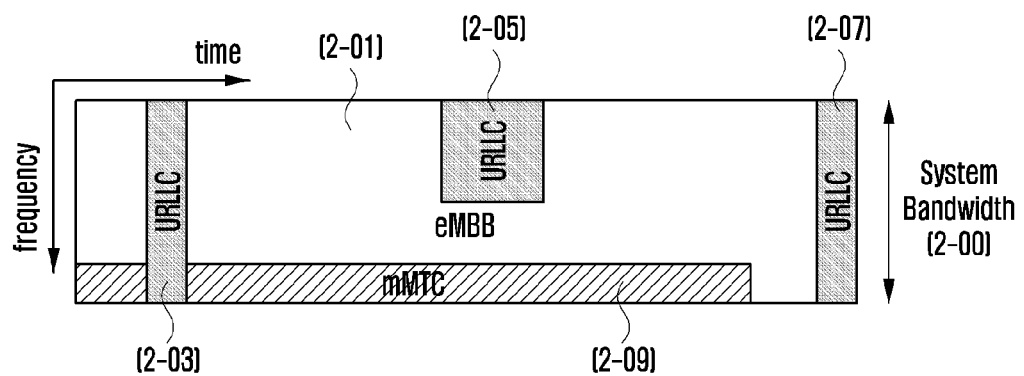
FIGS. 2 and 3 are diagrams illustrating that data for eMBB, URLLC, and mMTC, which are services considered in a 5G or NR system, are allocated in frequency-time resources.
Figure 3:
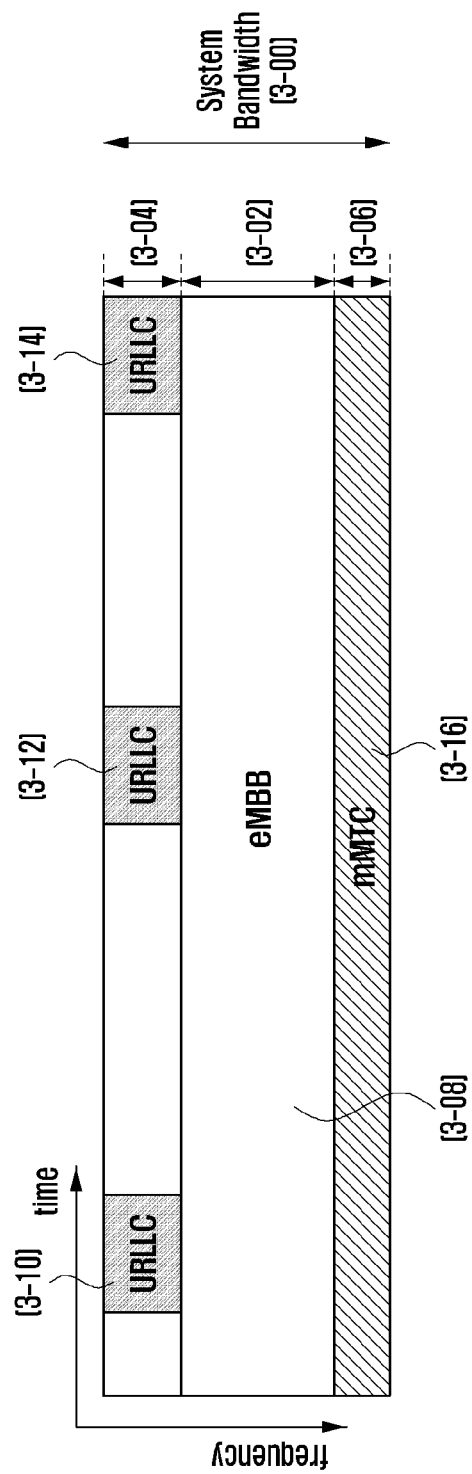

FIGS. 2 and 3 are diagrams illustrating that data for eMBB, URLLC, and mMTC, which are services considered in a 5G or NR system, are allocated in frequency-time resources.

Through FIGS. 2 and 3, a scheme that frequency and time resources are allocated for information transmission in each system can be seen.

First, FIG. 2 shows a state in which data for eMBB, URLLC, and mMTC are allocated in the entire system frequency band 2-00. When URLLC data 2-03, 2-05, or 2-07 occurs and needs to be transmitted while eMBB data 2-01 and mMTC data 2-09 are allocated and transmitted in a specific frequency band, the base station or the terminal may empty or may not transmit a part to which the eMBB data 2-01 and the mMTC data 2-09 have been already allocated, and may transmit the URLLC data 2-03, 2-05, or 2-07. URLLC among the above-mentioned services needs to reduce a latency time, so the URLLC data 2-03, 2-05, or 2-07 may be allocated to and transmitted in a part of resources to which the eMBB data 2-01 is allocated. If the URLLC data 2-03, 2-05, or 2-07 is additionally allocated to and transmitted in the resource to which the eMBB data 2-01 is allocated, the eMBB data may not be transmitted in the overlapped frequency-time resource, and therefore the transmission performance of the eMBB data may be lowered. That is, in this case, a failure in the eMBB data transmission may occur due to the allocation of the URLLC data.

In FIG. 3, a method for transmitting services and data in respective sub-bands 3-02, 3-04, and 3-06 by dividing the entire system frequency band 3-00 will be described. Information related to sub-band configuration may be predetermined, and this information may be transmitted from the base station to the terminal through higher level signaling. According to another example, the information related to the sub-band may be arbitrarily divided by the base station or the network node, and services may be provided to the terminal without separate transmission of sub-band configuration information. In FIG. 3, it is assumed that a sub-band 3-02 is used for transmission of eMBB data 3-08, a sub-band 3-04 is used for transmission of URLLC data 3-10, 3-12, or 3-14, and a sub-band 3-06 is used for transmission of mMTC data 3-16.

Throughout embodiments, a length of a transmission time interval (TTI) used for URLLC data transmission may be shorter than a TTI length used for eMBB data transmission or mMTC data transmission. In addition, a response of information related to URLLC data may be transmitted faster than eMBB data or mMTC data, and thus information may be transmitted and received with low latency. Structures of physical layer channels used for respective types to transmit the above-described three services or data may be different. For example, at least one of a length of a TTI, an allocation unit of a frequency resource, a structure of a control channel, and a data mapping method may be different.

Although three types of services and three types of data have been described in the above embodiments, more types of services and corresponding data may exist, and even in this case, the contents of the disclosure may also be applied.

The terms physical channel and signal in the NR system may be used to describe the method and device proposed in the disclosure. However, the contents of the disclosure may be applied not only to the NR system but also to other wireless communication systems.

Figure 4:
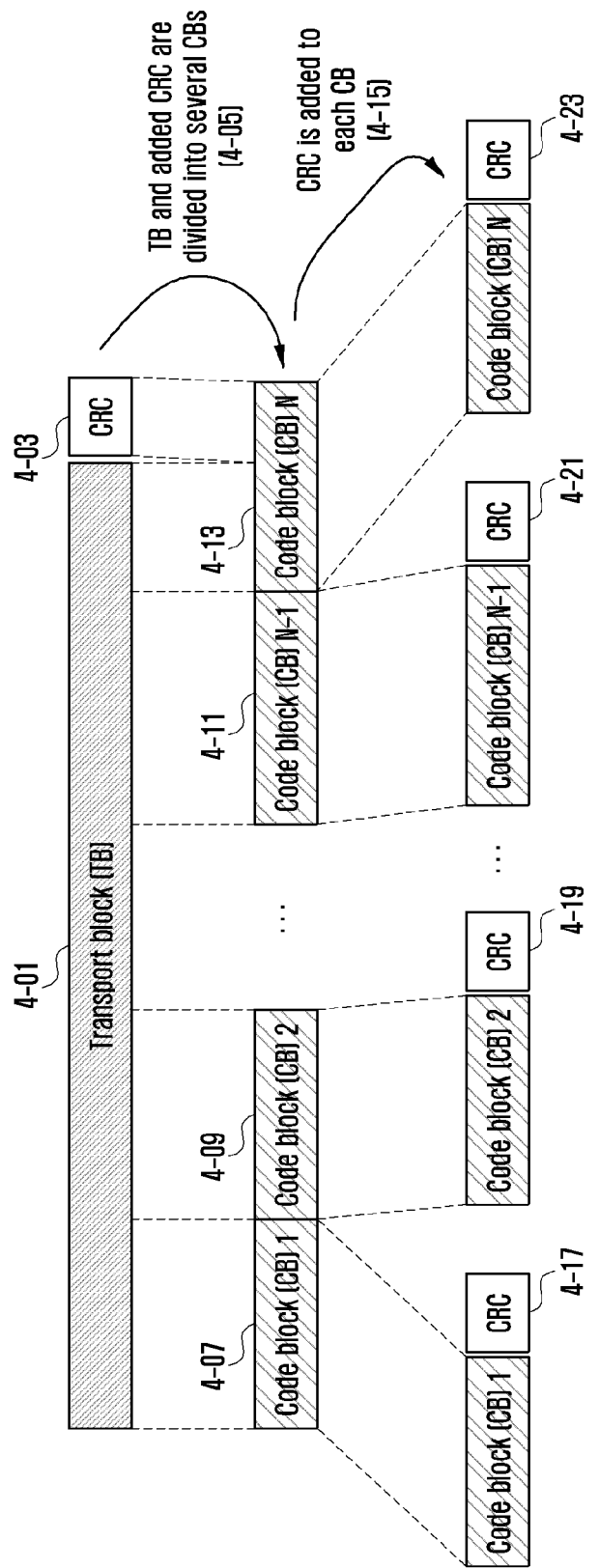
FIG. 4 is a diagram illustrating that one transport block is divided into several code blocks and a CRC is added according to an embodiment of the disclosure.

FIG. 4 is a diagram illustrating that one transport block is divided into several code blocks and a CRC is added according to an embodiment of the disclosure.

Referring to FIG. 4, a CRC 4-03 may be added to the last or front part of one transport block (TB) 4-01 to be transmitted in uplink or downlink. The CRC 4-03 may have 16 bits, 24 bits, a predetermined number of bits, or a variable number of bits depending on a channel condition, and may be used to determine whether or not channel coding is successful. The TB 4-01 and a block to which the CRC 4-03 is added may be divided 4-05 into several code blocks (CBs) 4-07, 4-09, 4-11, and 4-13. Here, the maximum size of the code block may be determined in advance, and in this case, the last code block 4-13 may have a smaller size than the other code blocks 4-07, 4-09, and 4-11. However, this is only an example. According to another example, 0, a random value, or 1 is inserted into the last code block 4-13, so that the last code block 4-13 and the other code blocks 4-07, 4-09, and 4-11 may have the same length.

CRCs 4-17, 4-19, 4-21, and 4-23 may be added 4-15 to the code blocks 4-07, 4-09, 4-11, and 4-13, respectively. The CRC may have 16 bits, 24 bits, or a predetermined number of bits, and may be used to determine whether channel coding succeeds.

The TB 4-01 and a cyclic generator polynomial may be used to generate the CRC 4-03, and the cyclic generator polynomial may be defined in various manners. For example, assuming that the cyclic generator polynomial is gCRC24A(D)=-D24+D23+D18+D17+D14+D11+D10+D7+D6+D5+D4+D3+D+1 for 24-bit CRC, and that L is 24, the CRC $p_0, p_1, p_2, p_3, \ldots, p_{L-1}$ for TB data $a_0, a_1, a_2, a_3, \ldots, a_{A-1}$ may be determined as a value that when dividing $a_0 D^{A+23} + a_1 D^{A+22} + \ldots + a_{A-1} D^{24} + p_0 D^{23} + p_1 D^{22} + \ldots + p_{22} D^1 + p_{23}$ by gCRC24A(D), the remainder is zero. Although the foregoing description has been made on the assumption that the CRC length L is 24, the CRC length L may be determined to have various lengths such as 12, 16, 24, 32, 40, 48, 64, and the like.

After the CRC is added to the TB through this process, it can be divided into N CBs 4-07, 4-09, 4-11, and 4-13. The CRCs 4-17, 4-19, 4-21, and 4-23 may be added 4-15 to the CBs 4-07, 4-09, 4-11, and 4-13, respectively. The CRC added to the CB may have a length different from that of the CRC added to the TB, or may use a different cyclic generator polynomial. However, the CRC 4-03 added to the TB and the CRCs 4-17, 4-19, 4-21, and 4-23 added to the code blocks may be omitted depending on the type of channel code to be applied to the code block. For example, when an LDPC code, not a turbo code, is applied to the code block, the CRCs 4-17, 4-19, 4-21, and 4-23 to be inserted for the respective code blocks may be omitted.

However, even when LDPC is applied, the CRCs 4-17, 4-19, 4-21, and 4-23 may be still added to the code blocks. Also, even when a polar code is used, such a CRC may be added or omitted.

As described above in FIG. 4, for the TB to be transmitted, the maximum length of one code block is determined depending on the type of channel coding applied, and the TB and the CRC added to the TB may be divided into code blocks in accordance with the maximum length of the code block.

In the conventional LTE system, a CRC for a CB is added to a divided CB. A data bit of the CB and the CRC are encoded with channel code, thereby coded bits are determined, and as promised in advance, the number of bits for rate matching may be determined for the respective coded bits.

Figure 5:
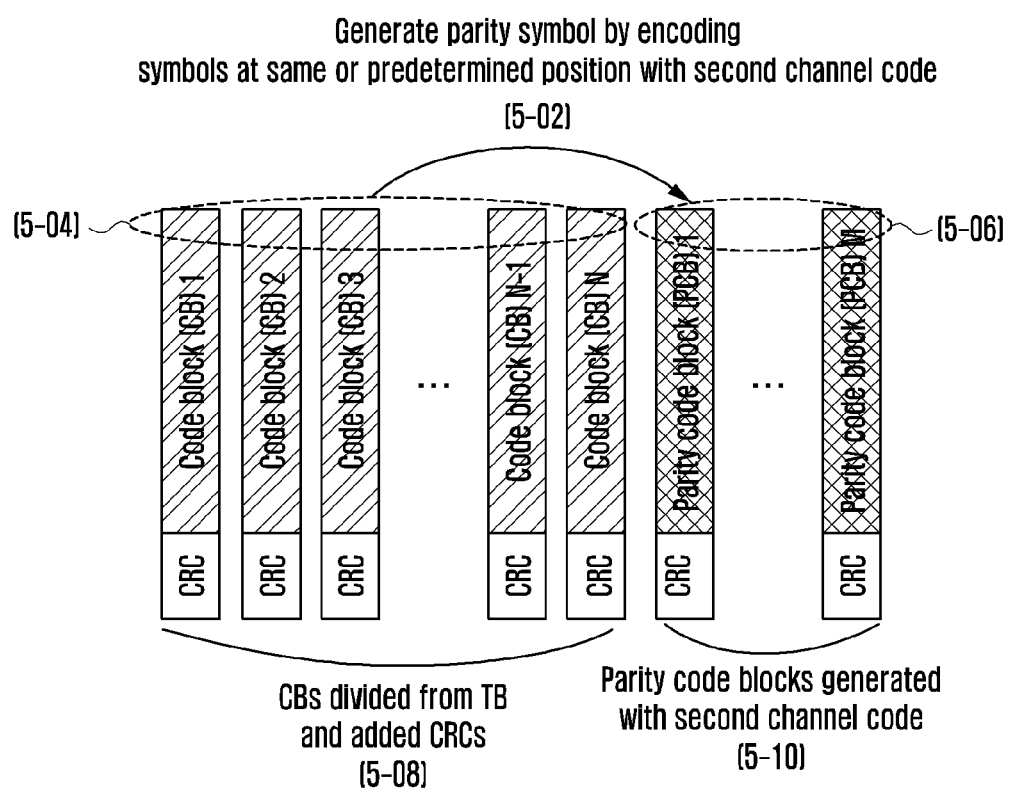
FIG. 5 is a diagram illustrating a scheme that an outer code is used and transmitted according to an embodiment of the disclosure.

FIG. 5 is a diagram illustrating a scheme that an outer code is used and transmitted according to an embodiment of the disclosure. In addition, FIG. 6 is a block diagram illustrating a structure of a communication system using an outer code according to an embodiment of the disclosure.

Figure 6:
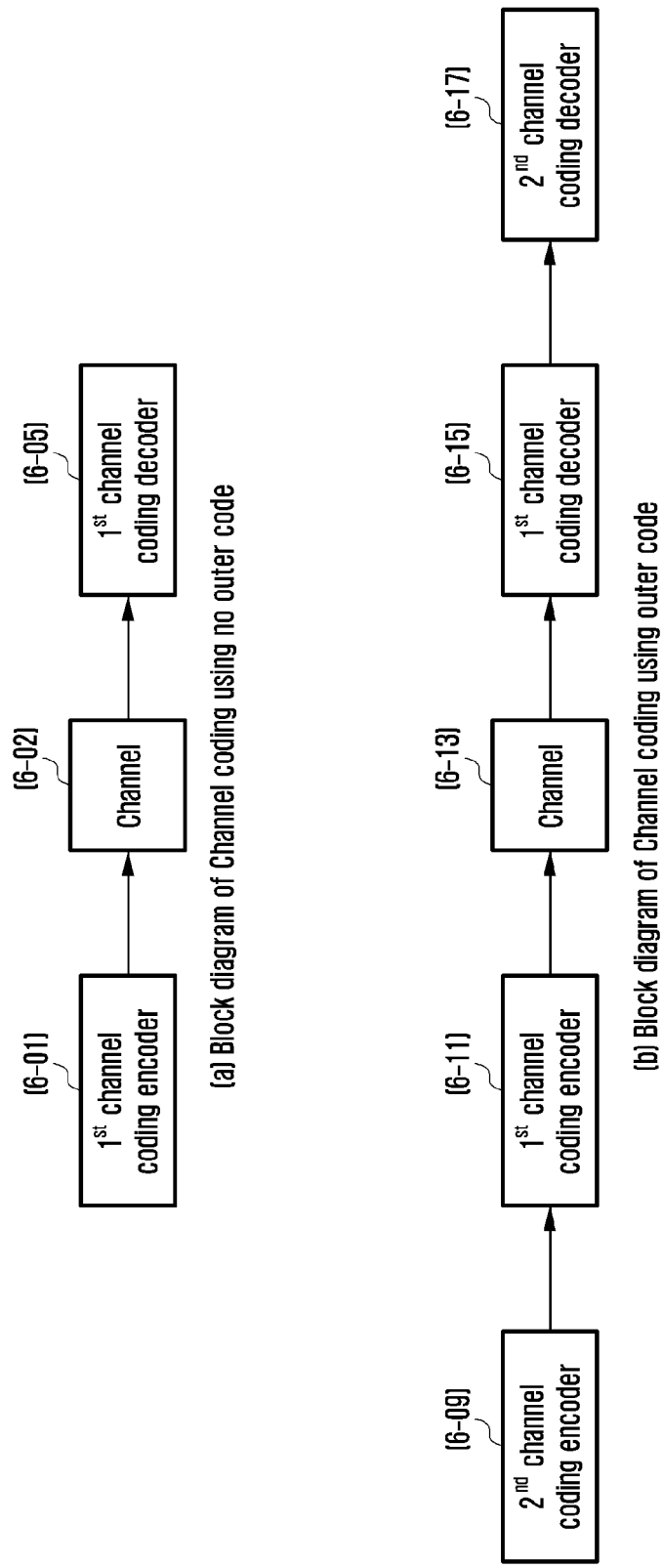
FIG. 6 is a block diagram illustrating a structure of a communication system using an outer code according to an embodiment of the disclosure.

Referring to FIGS. 5 and 6, a method of transmitting a signal by using an outer code can be seen.

In FIG. 5, after one transport block is divided into several code blocks, bits or symbols 5-04 located at the same position in each code block are encoded with the second channel code to generate 5-02 parity bits or symbols 5-06. After that, CRCs 5-08 and 5-10 may be added to the code blocks and the parity code blocks generated by the second channel code encoding.

Whether to add the CRC may be determined depending on the type of the channel code. For example, the CRCs 5-08 and 5-10 are added in case where the turbo code is used as the first channel code, and then the respective code blocks and parity code blocks are encoded through the first channel code encoding. In the disclosure, as the first channel code, a convolutional code, an LDPC code, a turbo code, a polar code, etc. may be used. However, this is only an example, and various channel codes may be applied to the disclosure as the first channel code. In the disclosure, as the second channel code, a Reed-Solomon code, a BCH code, a raptor code, a parity bit generation code, and the like may be used for example. However, this is only an example, and various channel codes may be applied to the disclosure as the second channel code.

Referring to FIG. 6(a), when the outer code is not used, only both a first channel coding encoder 6-01 and a first channel coding decoder 6-05 are used in a transceiver, and both a second channel coding encoder and a second channel coding decoder may not be used. Even when the outer code is not used, the first channel coding encoder 6-01 and the first channel coding decoder 6-05 may be configured in the same way as when the outer code is used, which will be described later.

Referring to FIG. 6(b), when the outer code is used, data to be transmitted may pass through a second channel coding encoder 6-09. Bits or symbols that have passed through the second channel coding encoder 6-09 may pass through a first channel coding encoder 6-11. When channel-coded symbols arrive at a receiver through a channel 6-13, the receiver may sequentially operate a first channel coding decoder 6-15 and a second channel coding decoder 6-17, based on received signals. The first channel coding decoder 6-15 and the second channel coding decoder 6-17 may perform operations corresponding to the first channel coding encoder 6-11 and the second channel coding encoder 6-09, respectively.

Figure 7:
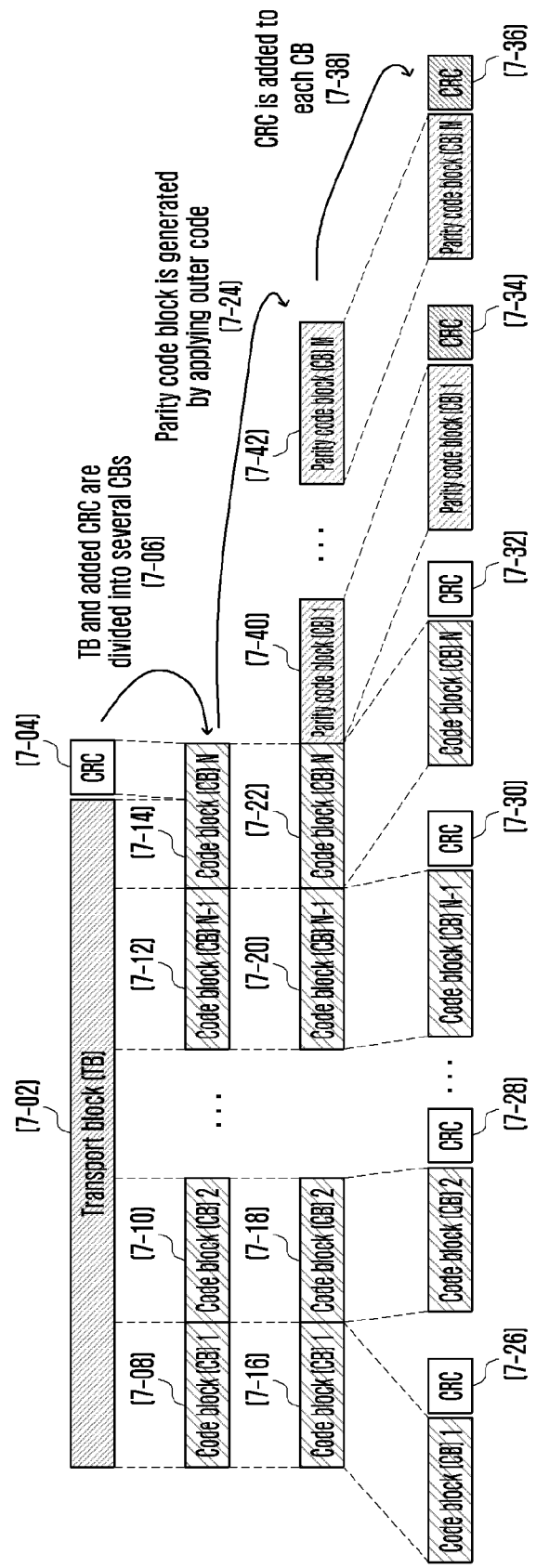
FIG. 7 is a diagram illustrating a method of generating one or more parity code blocks by applying a second channel code or an outer code to several code blocks divided from one transport block according to an embodiment of the disclosure.

FIG. 7 is a diagram illustrating a method of generating one or more parity code blocks by applying a second channel code or an outer code to several code blocks divided from one transport block according to an embodiment of the disclosure.

As described above in FIG. 4, one transport block may be divided into one or more code blocks. At this time, if only one code block is generated according to the size of the transport block, the CRC may not be added to the code block. When the outer code is applied to the code blocks to be transmitted, parity code blocks 7-40 and 7-42 may be generated 7-24. When the outer code is used, the parity code blocks 7-40 and 7-42 may be located 7-24 after the last code block. After the outer code is used, CRCs 7-26, 7-28, 7-30, 7-32, 7-34, and 7-36 may be added 7-38. Then, together with the CRCs, the respective code blocks and parity code blocks may be encoded with a channel code.

In the NR system, the size of the TB can be calculated through the following steps.

Step 1: NRE', which is the number of REs allocated to PDSCH mapping in one PRB in allocated resources, is calculated.

NRE' can be calculated as $N_{SC}^{RB} \cdot N_{symb}^{sh} - N_{DMRS}^{PRB} - N_{oh}^{PRB}$. Here, $N_{SC}^{RB}$ is 12, and $N_{symb}^{sh}$ may indicate the number of OFDM symbols allocated to the PDSCH. $M_{DMRS}^{PRB}$ is the number of REs in one PRB occupied by DMRSs of the same CDM group. $N_{oh}^{PRB}$ is the number of REs occupied by the overhead in one PRB configured via higher level signaling, and may be set to one of 0, 6, 12, and 18. Then, the total number of REs allocated to the PDSCH, NRE, can be calculated. NRE is calculated as min(156, $N_{RE}') \cdot n_{PRB}$, and nPRB indicates the number of PRBs allocated to the terminal.

Step 2: The number of temporary information bits $N_{info}$ may be calculated as $N_{RE}*R*Q_m*v$. Here, R is a code rate, Qm is a modulation order, and information on this value may be transmitted using an MCS bit field and a pre-arranged table in control information. Also, v is the number of allocated layers. If $N_{info} \leq 3824$, TBS can be calculated through step 3 below. Otherwise, TBS may be calculated through step 4.

Step 3: $N'_{info}$ can be calculated via equations $$N'_{info} = \max\left(24, 2^n * \left\lfloor \frac{N_{info}}{2^n} \right\rfloor\right)$$

and $n = \max(3, \lfloor \log_2(N_{info}) \rfloor - 6)$. TBS may be determined as a value closest to $N'_{info}$ among values not smaller than $N'_{info}$ in Table 6 below.

TABLE 6

| Index | TBS |
|-------|-----|
| 1 | 24 |
| 2 | 32 |
| 3 | 40 |

TABLE 6-continued

| Index | TBS |
|---|---|
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N'_{info}$ can be calculated through equations $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$. TBS can be determined through the value of $N'_{info}$ and the following [pseudo-code 1].

[Start of Pseudo-Code 1]

if $R \leq 1/4$ $$TBS = 8 * C * \left\lceil \frac{N'_{info} + 24}{8 * C} \right\rceil - 24, \text{ where } C = \left\lceil \frac{N'_{info} + 24}{3816} \right\rceil$$

else if $N'_{info} > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if end if

[End of Pseudo-Code 1]

When one CB is input to the LDPC encoder in the NR system, parity bits may be added and output. In this case, the amount of parity bits may vary according to an LDCP base graph. A method of sending all parity bits generated by LDPC coding with respect to a specific input may be referred to as full buffer rate matching (FBRM), and a method of limiting the number of transmittable parity bits may be referred to as limited buffer rate matching (LBRM). When resources are allocated for data transmission, the output of the LDPC encoder is made into a circular buffer, and the bits of the created buffer are repeatedly transmitted as much as the allocated resources. Here, the length of the circular buffer may be referred to as Ncb. If the number of all parity bits generated by the LDPC coding is N, Ncb becomes N in the FBRM method. In the LBRM method, $N_{cb}$ becomes min $(N, N_{ref})$ $N_{ref}$ is given as $$\left\lfloor \frac{TBS_{LBRM}}{C \cdot R_{LBRM}} \right\rfloor,$$

and $R_{LBRM}$ can be determined to be 2/3. $TBS_{LBRM}$ represents the maximum number of layers supported by the terminal in the cell in the above-described method for obtaining TBS, and it is assumed that the maximum modulation order is set for the terminal in the cell or, if not, 64QAM. It is also assumed that the code rate is the maximum code rate 948/1024, $N_{RE}$ is 156·$n_{pRB}$, and $n_{PRB}$ is $n_{PRB,LBRM}$, which may be given in Table 7 below.

TABLE 7

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The maximum data rate supported by the terminal in the NR system may be determined through the following Equation 1.

$$\text{data rate (in } Mbps\text{)} = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right) \quad \text{Equation 1}$$

In Equation 1, J is the number of carriers bound by frequency aggregation, Rmax is 948/1024, $v_{Layers}^{(j)}$ is the maximum number of layers, $Q_m^{(j)}$ is the maximum modulation order, $f^{(j)}$ is the scaling index, and μ is the subcarrier spacing. $f^{(j)}$ may be reported by the terminal as one of 1, 0.8, 0.75, and 0.4, and μ may be given in Table 8 below.

TABLE 8

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, $T_s^\mu$ is the average OFDM symbol length, $T_s^\mu$ may be calculated as $$\frac{10^{-3}}{14 \cdot 2^\mu},$$

and $N_{PRB}^{BW(j),\mu}$ is the maximum number of RBs in BW(j). $OH^{(j)}$ is the overhead value, it may be given as 0.14 in downlink and 0.18 in uplink in case of FR1 (band below 6 GHz), and as 0.08 in downlink and 0.10 in uplink in case of FR2 (band above 6 GHz). Through Equation 1, the maximum data rate in downlink in a cell having a 100 MHz frequency bandwidth at a 30 kHz subcarrier spacing can be calculated in Table 9 below.

TABLE 9

| $f^{(j)}$ | $v_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, the actual data rate that the terminal can measure in actual data transmission may be a value obtained by dividing the amount of data by the data transmission time. This may be a value obtained when dividing TBS by the TTI length in transmission of 1 TB or dividing the sum of TBSs by the TTI length in transmission of 2 TBs. For example, the maximum actual data rate in downlink in a cell having a 100 MHz frequency bandwidth at a 30 kHz subcarrier spacing as the assumption for obtaining Table 6 may be determined as shown in Table 10 below according to the number of allocated PDSCH symbols.

TABLE 10

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225.280 | 27 | 225.480 | 0.107143 | 2,104.48 |
| 4 | 8 | 40 | 10920 | 323505.0 | 13 | 319.488 | 38 | 319.784 | 0.142857 | 2,238.49 |
| 5 | 8 | 52 | 14196 | 420556.5 | 13 | 417.792 | 50 | 417.976 | 0.178571 | 2,340.67 |
| 6 | 8 | 64 | 17472 | 517608.0 | 13 | 516.096 | 62 | 516.312 | 0.214286 | 2,409.46 |
| 7 | 8 | 76 | 20748 | 614659.5 | 14 | 622.592 | 74 | 622.760 | 0.250000 | 2,491.04 |
| 8 | 8 | 88 | 24024 | 711711.0 | 14 | 704.512 | 84 | 704.904 | 0.285714 | 2,467.16 |
| 9 | 8 | 100 | 27300 | 808762.5 | 14 | 802.816 | 96 | 803.304 | 0.321429 | 2,499.17 |
| 10 | 8 | 112 | 30576 | 905814.0 | 14 | 901.120 | 107 | 901.344 | 0.357143 | 2,523.76 |
| 11 | 8 | 124 | 33852 | 1002865.5 | 14 | 999.424 | 119 | 999.576 | 0.392857 | 2,544.38 |

TABLE 10-continued

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 12 | 8 | 136 | 37128 | 1099917.0 | 15 | 1,114.112 | 133 | 1,115.048 | 0.428571 | 2,601.78 |
| 13 | 8 | 148 | 40404 | 1196968.5 | 15 | 1,212.416 | 144 | 1,213.032 | 0.464286 | 2,612.68 |
| 14 | 8 | 160 | 43680 | 1294020.0 | 15 | 1,277.952 | 152 | 1,277.992 | 0.500000 | 2,555.98 |

The maximum data rate supported by the terminal can be identified through Table 9, and the actual data rate according to the allocated TBS can be identified through Table 10. Depending on scheduling information, there may be a case where the actual data rate is greater than the maximum data rate.

In a wireless communication system, particularly, in the NR system, a data rate that the terminal can support may be determined or calculated in advance between the base station and the terminal. This may be calculated using the maximum frequency band, the maximum modulation order, the maximum number of layers, and the like supported by the terminal. However, the calculated data rate may be different from a value calculated from the size (TBS) of a transport block (TB) and TTI length used for actual data transmission.

Therefore, the terminal may be allocated a TBS greater than the value corresponding to the data rate supported by the terminal. It may be necessary to minimize this case and define the operation of the terminal in this case. The following embodiment provides a method and device for solving a case where the maximum data rate that the terminal can support and the actual data rate according to scheduling do not match. In the above, the maximum data rate may be a value determined based on the capability of the terminal, and the actual data rate may be a value determined based on scheduling information at the moment data is transmitted.

Hereinafter, embodiments of the disclosure will be described in detail with reference to the accompanying drawings. In addition, if it is determined that a detailed description of a related function or configuration unnecessarily obscures the subject matter of the disclosure, the detailed description will be omitted. Further, the terms used herein are terms defined in consideration of functions in the disclosure, and may vary according to a user's or operator's intention or customs. Therefore, the definition should be made based on the content throughout the disclosure. In the disclosure, a base station refers to an entity performing resource allocation of a terminal, and may be at least one of a gNode B (gNB), an eNode B (eNB), a Node B, a base station (BS), a radio access unit, a base station controller, or a node on a network. In the disclosure, a terminal may include a user equipment (UE), a mobile station (MS), a cellular phone, a smart phone, a computer, or a multimedia system capable of performing a communication function. In the disclosure, a downlink (DL) is a wireless transmission path of a signal transmitted from a base station to a terminal, and an uplink (UL) is a wireless transmission path of a signal transmitted from a terminal to a base station. Although embodiments of the disclosure will be described below using an NR system as an example, such embodiment may be applied to other communication systems having a similar technical background or channel type. In addition, the embodiments of the disclosure may be applied to other communication systems through some modifications within a range that does not significantly depart from the scope of the disclosure as will be apparent to a person skilled in the art.

In the disclosure, the terms of a physical channel and a signal may be used interchangeably with data or a control signal. For example, PDSCH is a physical channel through which data is transmitted, but the PDSCH may be referred to as data in the disclosure.

In the disclosure, higher signaling is a signal transmission method from a base station to a terminal using a downlink data channel of a physical layer or from a terminal to a base station using an uplink data channel of a physical layer, and may also be referred to as RRC signaling or a MAC control element (CE).

In the disclosure, a peak data rate, a max data rate, a maximum data rate, etc. may be used interchangeably.

First Embodiment

The first embodiment relates to a method and device for performing scheduling so as not to exceed a maximum data rate of a terminal in performing data retransmission and for receiving data. In this embodiment and subsequent embodiments, data may be referred to as a TB or a transport block.

When accessing a base station, a terminal can report the capability of the terminal to the base station. The capability of the terminal may include at least one of parameters to be used for calculating the maximum data rate of the terminal, such as the maximum number of layers, the maximum modulation order, and the like that the terminal can support.

The maximum data rate of the terminal may be calculated, for example, as given in Equation 1, based on the capability of the terminal reported to the base station and parameters configured for the terminal by the base station through RRC signaling. The maximum data rate of the terminal may be determined based on the baseband processing or signal processing capability of the terminal including channel estimation, equalization, channel code decoding, multi-antenna reception, and the like. That is, what the maximum data rate of a certain terminal is high may mean that the signal processing capability of the terminal is high.

The terminal may receive downlink control information including scheduling information, identify the scheduling information, and calculate an actual instantaneous data rate therefrom by using at least one of the following methods.

From the scheduling information, the terminal may know the amount of data to be transmitted/received or the value of a TBS, and may also identify the number of symbols to which PDSCH or PUSCH is mapped.

If the actual data rate calculated based on the information scheduled for the terminal is greater than the maximum data rate of the corresponding terminal, the terminal may not be able to finish the signal processing necessary for transmitting/receiving scheduled data within a given time. Therefore, it may be necessary for the base station to perform scheduling so that the actual instantaneous data rate is smaller than the maximum data rate of the terminal. This is because, if the actual instantaneous data rate is scheduled to be greater than the maximum data rate of the terminal, the terminal cannot complete signal processing within a given time, and this means that frequency time resources are inefficiently used.

Depending on a method of calculating the actual instantaneous data rate, a scheduling and data transmission/reception method may vary. For example, a method of checking whether the actual instantaneous data rate satisfies the capability of the terminal may be calculated based on Equation 2 below, for example. In Equation 2, the left side of the inequality sign may be considered as a scheduled instantaneous data rate, and the right side DataRateCC may be considered as the maximum data rate of the terminal determined according to the capability of the terminal in the corresponding serving cell.

$$\frac{\sum_{m=0}^{M-1} V_{j,m}}{L \times T_s^\mu} \le DataRateCC \qquad \text{Equation 2}$$

In the above, L is the number of OFDM symbols allocated to the PDSCH, and M is the number of TBs transmitted in the PDSCH. $T_s^\mu$ is calculated as $$T_s^\mu = \frac{10^{-3}}{2^\mu \cdot N_{symb}^{slot}},$$

and µ is the subcarrier spacing used for PDSCH transmission. In the m-th TB, $V_{j,m}$ calculated based on $$V_{j,m} = C' \cdot \left\lfloor \frac{A}{C} \right\rfloor,$$

wherein A is the size of the TB (TBS), C is the number of code blocks (CBs) included in the TB, and C' is the number of code blocks scheduled in the TB. In case of code block group (CBG) retransmission, C and C' may be different. $\lfloor x \rfloor$ is the largest integer not greater than x. In the above, DataRateCC is the maximum data rate supported by the terminal in the corresponding carrier or serving cell, and may be determined based on Equation 1. Alternatively, it may be calculated as in Equation 3 below.

$$\text{data rate (in } Mbps) = \qquad \text{Equation 3}$$
$$10^{-6} \cdot v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)})$$

The above equation is an example of calculating the DataRateCC of the j-th serving cell.

In Equation 3, Rmax=948/1024, $v_{Layers}^{(j)}$ is the maximum number of layers, $Q_m^{(j)}$ is the maximum modulation order, $f^{(j)}$ is the scaling index, and µ is the subcarrier spacing. $f^{(j)}$ may be reported by the terminal as one of 1, 0.8, 0.75, and 0.4, and µ may be given in Table 8 above. Also, $T_s^\mu$ is the average OFDM symbol length, $T_s^\mu$ may be calculated as $$\frac{10^{-3}}{14 \cdot 2^\mu},$$

and $N_{PRB}^{BW(j),\mu}$ is the maximum number of RBs in BW(j). $OH^{(j)}$ is the overhead value, and may be given as 0.14 in downlink and 0.18 in uplink in case of FR1 (band below 6 GHz), and as 0.08 in downlink and 0.10 in uplink in case of FR2 (band above 6 GHz).

For example, another method of checking whether the actual instantaneous data rate satisfies the capability of the terminal may be calculated based on Equation 4 below. In Equation 4, the left side of the inequality sign may be considered as the instantaneous data rate transmitted from J serving cells at the scheduled moment, and the right side DataRate may be considered as the maximum data rate of the terminal configured according to the capability of the terminal in the J serving cells. The slot s_j is a slot in the serving cell j that overlaps with or includes a specific time point at which the instantaneous data rate is to be calculated.

$$\sum_{j=0}^{J-1} \frac{\sum_{m=0}^{M-1} V_{j,m}}{T_{slot}^{\mu(j)}} \le DataRate \qquad \text{Equation 4}$$

In the above, J is the number of serving cells configured for the corresponding terminal in the corresponding frequency range. For the j-th serving cell, M is the number of TBs transmitted in the slot s_j. In addition, $T_{slot}^{\mu(j)} = 10^{-3}/2^{\mu(j)}$, and µ(j) is the subcarrier spacing used for PDSCH in the slot s_j of the j-th serving cell. For the m-th TB, $V_{j,m}$ is calculated as $$V_{j,m} = C' \cdot \left\lfloor \frac{A}{C} \right\rfloor,$$

wherein A is the size of the TB (TBS), C is the number of code blocks (CBs) included in the TB, and C' is the number of code blocks scheduled in the TB. In case of CBG retransmission, C and C' may be different. $\lfloor x \rfloor$ indicates the largest integer not greater than x. In the above, DataRate is the maximum data rate supported by the corresponding terminal in the configured J serving cells, and may be determined based on Equation 1.

In Equation 4 above, the actual average data rate of the terminal at a specific time point (reference time) may be determined by considering the sum of the total number of bits of the TB or CB included in the PDSCH or PUSCH scheduled in the slot including the corresponding time point. In the above, the slot including the specific time point may be determined as shown in FIG. 11.

Figure 11:
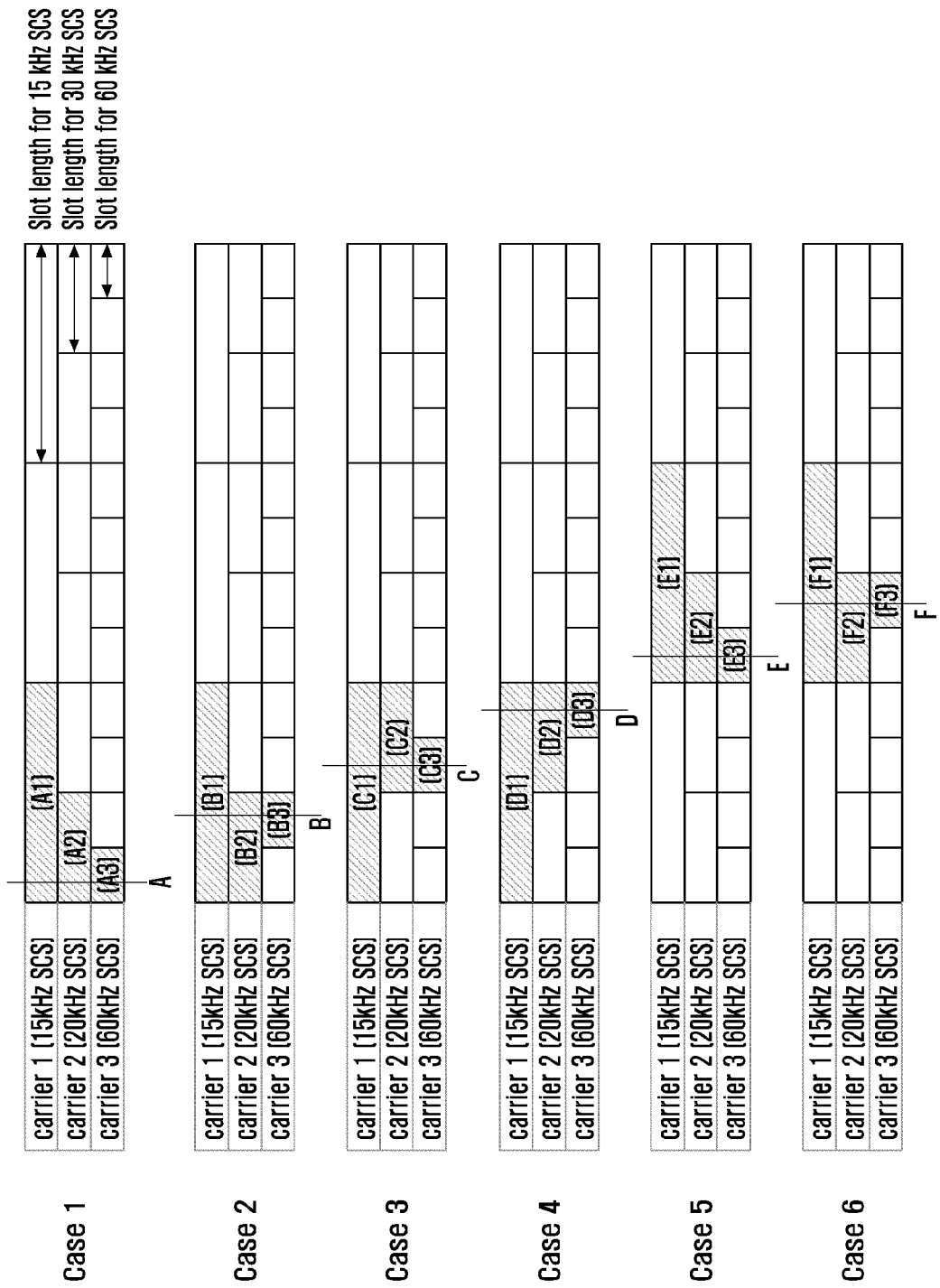
FIG. 11 is a diagram illustrating an example of determining a slot including a specific time point in a carrier configured for a terminal via higher signaling according to an embodiment of the disclosure.

FIG. 11 is a diagram illustrating an example of determining a slot including a specific time point in a carrier configured for a terminal via higher signaling according to an embodiment of the disclosure.

The length of the slot may be different for each carrier depending on the subcarrier spacing, and the indicated slot is the slot including a specific time point. As the specific time point is changed, for example, from the reference time point A to the reference time point B, a slot including the specific time point may be changed, for example, from the slots A1, A2, and A3 to the slots B1, B2, and B3.

In the example of FIG. 11, the slot A1 and the slot B1 may be the same slot, and the slot A2 and the slot B2 may be the same slot. Therefore, for example, when calculating the actual average data rate of the terminal at the reference time A, only the PDSCH or PUSCH mapped to the slots (i.e., slots A1, A2, and A3) including the reference time A, which is the corresponding specific time point, may be considered to use code blocks transmitted in the PDSCH or PUSCH.

When the reference time is changed from D to time E, slots including the reference time are changed from D1, D2, and D3 to E1, E2, and E3, and in this case, all slots including the reference time are changed. The terminal can perform operations for PDSCH reception and PUSCH transmission only when the actual data rate calculated as described above is scheduled to be smaller than its maximum data rate calculated as in Equation 1. If the calculated actual data rate is greater than its maximum data rate, the PDSCH reception and PUSCH transmission operations in the corresponding slot may be omitted. In this embodiment and subsequent embodiments, the slot including the reference time may be referred to as an overlapped slot.

In the above, Equation 4 may be a condition applied to all cases including initial transmission and retransmission, and Equation 2 may be a condition applied to retransmission. However, Equation 2 or 4 is only an example of a condition for limiting scheduling, and is not construed as a limitation of the disclosure.

In all cases where the base station schedules the retransmission of a specific TB to the terminal, if the scheduling is limited to satisfy the condition of Equation 2, there may be many cases where the retransmission cannot be scheduled.

In the above, what the base station "schedules retransmission of a specific TB" to the terminal may mean a condition that "MCS is greater than 27" in case of being configured with MCS table 2 below, or may mean a condition that "MCS is greater than 28" in case of being configured with any other than MCS table 2.

In the actual retransmission of the NR system, data transmission and reception may be performed through scheduling using all MCS values. In this embodiment and subsequent embodiments, scheduling retransmission may be interpreted as scheduling using an MCS value greater than 27, that is, an MCS value of 28, 29, 30, or 31 when scheduling is performed based on MCS table 2. This is, however, exemplary only, and using any other MCS value may also be applied to case of retransmission.

In addition, scheduling retransmission in this embodiment and subsequent embodiments may be interpreted as scheduling using an MCS value greater than 28, that is, an MCS value of 29, 30, or 31 when scheduling is performed based on any other than MCS table 2 or based on MCS Table 1 or MCS Table 3. This is, however, exemplary only, and using any other MCS value may also be applied to case of retransmission.

TABLE 1

| MCS | | | |
|---|---|---|---|
| MCS Index $I_{MCS}$ | Modulation Order $Q_m$ | Target code Rate R x [1024] | Spectral efficiency |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |

TABLE 1-continued

| MCS | | | |
|---|---|---|---|
| MCS Index $I_{MCS}$ | Modulation Order $Q_m$ | Target code Rate R x [1024] | Spectral efficiency |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 2

| MCS | | | |
|---|---|---|---|
| MCS Index $I_{MCS}$ | Modulation Order $Q_m$ | Target code Rate R x [1024] | Spectral efficiency |
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 3

| MCS Index $I_{MCS}$ | Modulation Order $Q_m$ | Target code Rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | reserved |
| 30 | 4 | | reserved |
| 31 | 6 | | reserved |

Or, specifically, case where an IMCS value for at least one TB in the DCI is greater than a specific value (W is 27 or 28) may be assumed or considered as retransmission. In the above, the specific value for comparison with the IMCS may be determined to be 27 or 28 depending on configuration of which MCS table to use.

For example, it may be determined depending on the higher parameter mcs-Table value in the configuration related to PDSCH transmission, PUSCH transmission, or SPS transmission. As an example, the specific value may be 27 in case of being configured as qam256', and may be 28 in other cases.

In one example where the subcarrier spacing is 120 kHz, the frequency bandwidth is 100 MHz, two-layer transmission is used with 64QAM, and the base station initially transmits one TB to the terminal by using PDSCH via 7 symbols with MCS 26, retransmission may not be performed with the same 7 symbols. This is because a certain terminal may not be able to process scheduling that violates the condition of Equation 2.

Therefore, when retransmission is performed, cases of considering the scheduling restriction condition (e.g., Equation 2) when the base station and the terminal determine a subsequent operation may be limited to specific cases. Meanwhile, although Equation 2 will be described hereinafter as an example of the scheduling restriction condition, embodiments of the disclosure are not limited thereto.

For example, it may be limited only when the number of symbols L allocated to PDSCH transmission of retransmission is less than 7. This may be a method of, in case where retransmission is performed or the IMCS value for at least one TB in the DCI is greater than a specific value (W=27 or 28), considering the condition given by Equation 2 only when the PDSCH is mapped to the number of symbols less than 7 symbols and transmitted. That is, this method does not apply the condition of Equation 2 when the number of symbols L to which the PDSCH used for retransmission is mapped is greater than or equal to 7.

In this embodiment and subsequent embodiments, a demodulation reference signal (DMRS) symbol for PDSCH may also be included when calculating the number of symbols used for PDSCH mapping, the number of symbols allocated for PDSCH transmission, or the number of symbols used for PDSCH transmission. That is, in order to calculate the number of such symbols, all symbols for PDSCH transmission delivered through higher signaling or the DCI indicating PDSCH mapping information may be considered. Similarly, in case of PUSCH, DMRS symbols for PUSCH may be included for calculation.

In the above, considering the condition of Equation 2 only when the PDSCH is mapped to the number of symbols smaller than 7 symbols and transmitted may be because scheduling in which data transmitted in the initial transmission is mapped to a smaller number of symbols than 7 symbols is not frequent, and scheduling in which data transmitted in the initial transmission is mapped to 7 symbols or more is frequent. This condition relaxation can reduce the complexity of base station scheduling algorithm and implementation method.

Although in this embodiment the method of comparing the number of symbols L, to which PDSCH used for retransmission is mapped, with 7 symbols has been described as an example, the disclosure is not limited to 7 symbols and may be extended and applied to a method of comparing the number of symbols with other numbers such as 8 symbols and 9 symbols.

In addition to the above embodiment of applying the scheduling restriction condition (Equation 2) based on retransmission or not and the number of symbols of PDSCH, Equation 2 may be a condition applied to other cases. For example, a case where the terminal reports the capability of fast processing time, a case where an higher parameter of Capability2-PDSCH-Processing is configured, a case where processingType2Enabled in the higher parameter set of PDSCH-ServingCellConfig (or PUSCH-ServingCellConfig) is set to TRUE, Equation 2 may also be applied. In the above, what Equation 2 is applied may mean performing data transmission/reception based on scheduling only in case of the scheduling that satisfies Equation 2 by checking the condition of Equation 2.

Second Embodiment

The second embodiment relates to another method and device for performing scheduling so as not to exceed a maximum data rate of a terminal in performing data retransmission and for receiving data. In this embodiment and subsequent embodiments, data may be referred to as a TB or a transport block.

When accessing a base station, a terminal can report the capability of the terminal to the base station. The capability of the terminal may include at least one of parameters to be used for calculating the maximum data rate of the terminal, such as the maximum number of layers, the maximum modulation order, and the like that the terminal can support.

The maximum data rate of the terminal may be calculated, for example, as given in Equation 1, based on the capability of the terminal reported to the base station and parameters configured for the terminal by the base station through RRC signaling. The maximum data rate of the terminal may be determined based on the baseband processing or signal processing capability of the terminal including channel estimation, equalization, channel code decoding, multi-antenna reception, and the like. That is, what the maximum data rate of a certain terminal is high may mean that the signal processing capability of the terminal is high.

The terminal may receive downlink control information including scheduling information, identify the scheduling information, and calculate an actual instantaneous data rate therefrom by using at least one of the following methods.

From the scheduling information, the terminal may know the amount of data to be transmitted/received or the value of a TBS, and may also identify the number of symbols to which PDSCH or PUSCH is mapped.

If the actual data rate calculated based on the information scheduled for the terminal is greater than the maximum data rate of the corresponding terminal, the terminal may not be able to finish the signal processing necessary for transmitting/receiving scheduled data within a given time. Therefore, it may be necessary for the base station to perform scheduling so that the actual instantaneous data rate is smaller than the maximum data rate of the terminal. This is because, if the actual instantaneous data rate is scheduled to be greater than the maximum data rate of the terminal, the terminal cannot complete signal processing within a given time, and this means that frequency time resources are inefficiently used.

Depending on a method of calculating the actual instantaneous data rate, a scheduling and data transmission/reception method may vary. For example, a method of checking whether the actual instantaneous data rate satisfies the capability of the terminal may be calculated based on Equation 2 discussed above, for example. In Equation 2, the left side of the inequality sign may be considered as a scheduled instantaneous data rate, and the right side DataRateCC may be considered as the maximum data rate of the terminal determined according to the capability of the terminal in the corresponding serving cell.

For example, another method of checking whether the actual instantaneous data rate satisfies the capability of the terminal may be calculated based on Equation 4 discussed above. In Equation 4, the left side of the inequality sign may be considered as the instantaneous data rate transmitted from J serving cells at the scheduled moment, and the right side DataRate may be considered as the maximum data rate of the terminal configured according to the capability of the terminal in the J serving cells. The slot s_j is a slot in the serving cell j that overlaps with or includes a specific time point at which the instantaneous data rate is to be calculated.

In the above, Equation 4 may be a condition applied to all cases including initial transmission and retransmission, and Equation 2 may be a condition applied to retransmission. However, Equation 2 or 4 is only an example of a condition for limiting scheduling, and is not construed as a limitation of the disclosure.

In all cases where the base station schedules the retransmission of a specific TB to the terminal, if the scheduling is limited to satisfy the condition of Equation 2, there may be many cases where the retransmission cannot be scheduled. In the above, what the base station "schedules retransmission of a specific TB" to the terminal may mean a condition that MCS is greater than 27 in case of being configured with MCS table 2 below, or may mean a condition that MCS is greater than 28 in case of being configured with any other than MCS table 2. Detail is the same as described above.

Or, specifically, case where an IMCS value for at least one TB in the DCI is greater than a specific value (W is 27 or 28) may be assumed or considered as retransmission. In the above, the specific value for comparison with the IMCS may be determined to be 27 or 28 depending on configuration of which MCS table to use.

For example, it may be determined depending on the upper parameter mcs-Table value contained in the configuration related to PDSCH transmission, PUSCH transmission, or SPS transmission. As an example, the specific value may be 27 in case of being configured as qam256', and may be 28 in other cases.

This may be different depending on which table among MCS Table 1, MCS Table 2, and MCS Table 3 in the above is used for determining the scheduling for data transmission.

In one example where the subcarrier spacing is 120 kHz, the frequency bandwidth is 100 MHz, two-layer transmission is used with 64QAM, and the base station initially transmits one TB to the terminal by using PDSCH via 7 symbols with MCS 26, retransmission may not be performed with the same 7 symbols. This is because a certain terminal may not be able to process scheduling that violates the condition of Equation 2.

Therefore, when retransmission is performed, cases of considering the scheduling restriction condition (e.g., Equation 2) when the base station and the terminal determine a subsequent operation may be limited to specific cases. Meanwhile, although Equation 2 will be described hereinafter as an example of the scheduling restriction condition, embodiments of the disclosure are not limited thereto.

For example, when scheduling retransmission of a specific TB, a method of applying the condition of Equation 2 only when the number of symbols L to which PDSCH used for retransmission is mapped is smaller than the number of symbols L' to which PDSCH used for initial transmission is mapped may be used. That is, this method does not apply the condition of Equation 2 when the number of symbols L to which PDSCH used for retransmission is mapped is equal to or greater than the number of symbols L' to which PDSCH used for initial transmission is mapped.

In this embodiment and subsequent embodiments, a demodulation reference signal (DMRS) symbol for PDSCH may also be included when calculating the number of symbols used for PDSCH mapping. That is, in order to calculate the number of such symbols, all symbols for PDSCH transmission delivered through higher signaling or the DCI indicating PDSCH mapping information may be considered. Similarly, in case of PUSCH, DMRS symbols for PUSCH may be included for calculation.

This may be a method of, in case where retransmission is performed or the IMCS value for at least one TB in the DCI is greater than a specific value (W=27 or 28), considering the scheduling restriction condition given by Equation 2 only when PDSCH for retransmission is mapped to the number of symbols to which PDSCH used for initial transmission is mapped. This may be because, in many cases, the base station can reduce the complexity of base station scheduling algorithm and implementation method by using the same number of symbols for initial transmission and retransmission.

In addition to the above embodiment of applying the scheduling restriction condition (Equation 2) based on retransmission or not and the number of symbols of PDSCH, Equation 2 may be a condition applied to other cases. For example, a case where the terminal reports the capability of fast processing time, a case where an higher parameter of Capability2-PDSCH-Processing is configured, a case where processingType2Enabled in the higher parameter set of PDSCH-ServingCellConfig (or PUSCH-ServingCellConfig) is set to TRUE, Equation 2 may also be applied. In the above, what Equation 2 is applied may mean performing data transmission/reception based on scheduling only in case of the scheduling that satisfies Equation 2 by checking the condition of Equation 2.

Third Embodiment

The third embodiment relates to another method and device for performing scheduling so as not to exceed a maximum data rate of a terminal in performing data retransmission and for receiving data. In this embodiment and subsequent embodiments, data may be referred to as a TB or a transport block.

When accessing a base station, a terminal can report the capability of the terminal to the base station. The capability of the terminal may include at least one of parameters to be used for calculating the maximum data rate of the terminal, such as the maximum number of layers, the maximum modulation order, and the like that the terminal can support.

The maximum data rate of the terminal may be calculated, for example, as given in Equation 1, based on the capability of the terminal reported to the base station and parameters configured for the terminal by the base station through RRC signaling. The maximum data rate of the terminal may be determined based on the baseband processing or signal processing capability of the terminal including channel estimation, equalization, channel code decoding, multi-antenna reception, and the like. That is, what the maximum data rate of a certain terminal is high may mean that the signal processing capability of the terminal is high.

The terminal may receive downlink control information including scheduling information, identify the scheduling information, and calculate an actual instantaneous data rate therefrom by using at least one of the following methods.

From the scheduling information, the terminal may know the amount of data to be transmitted/received or the value of a TBS, and may also identify the number of symbols to which PDSCH or PUSCH is mapped.

If the actual data rate calculated based on the information scheduled for the terminal is greater than the maximum data rate of the corresponding terminal, the terminal may not be able to finish the signal processing necessary for transmitting/receiving scheduled data within a given time. Therefore, it may be necessary for the base station to perform scheduling so that the actual instantaneous data rate is smaller than the maximum data rate of the terminal. This is because, if the actual instantaneous data rate is scheduled to be greater than the maximum data rate of the terminal, the terminal cannot complete signal processing within a given time, and this means that frequency time resources are inefficiently used.

Depending on a method of calculating the actual instantaneous data rate, a scheduling and data transmission/reception method may vary. For example, a method of checking whether the actual instantaneous data rate satisfies the capability of the terminal may be calculated based on Equation 2 discussed above, for example. In Equation 2, the left side of the inequality sign may be considered as a scheduled instantaneous data rate, and the right side DataRateCC may be considered as the maximum data rate of the terminal determined according to the capability of the terminal in the corresponding serving cell.

For example, another method of checking whether the actual instantaneous data rate satisfies the capability of the terminal may be calculated based on Equation 4 discussed above. In Equation 4, the left side of the inequality sign may be considered as the instantaneous data rate transmitted from J serving cells at the scheduled moment, and the right side DataRate may be considered as the maximum data rate of the terminal configured according to the capability of the terminal in the J serving cells. The slot s_j is a slot in the serving cell j that overlaps with or includes a specific time point at which the instantaneous data rate is to be calculated.

In the above, Equation 4 may be a condition applied to all cases including initial transmission and retransmission, and Equation 2 may be a condition applied to retransmission. However, Equation 2 or 4 is only an example of a condition for limiting scheduling, and is not construed as a limitation of the disclosure.

In all cases where the base station schedules the retransmission of a specific TB to the terminal, if the scheduling is limited to satisfy the condition of Equation 2, there may be many cases where the retransmission cannot be scheduled. In the above, what the base station schedules retransmission of a specific TB to the terminal may mean a condition that MCS is greater than 27 in case of being configured with MCS table 2 below, or may mean a condition that MCS is greater than 28 in case of being configured with any other than MCS table 2. Detail is the same as described above.

Or, specifically, case where an IMCS value for at least one TB in the DCI is greater than a specific value (W is 27 or 28) may be assumed or considered as retransmission. In the above, the specific value for comparison with the IMCS may be determined to be 27 or 28 depending on configuration of which MCS table to use.

For example, it may be determined depending on the higher parameter mcs-Table value in the configuration related to PDSCH transmission, PUSCH transmission, or SPS transmission. As an example, the specific value may be 27 in case of being configured as qam256', and may be 28 in other cases.

In one example where the subcarrier spacing is 120 kHz, the frequency bandwidth is 100 MHz, two-layer transmission is used with 64QAM, and the base station initially transmits one TB to the terminal by using PDSCH via 7 symbols with MCS 26, retransmission may not be performed with the same 7 symbols. This is because a certain terminal may not be able to process scheduling that violates the condition of Equation 2.

Therefore, when retransmission is performed, cases of considering the scheduling restriction condition (e.g., Equation 2) when the base station and the terminal determine a subsequent operation may be limited to specific cases. Meanwhile, although Equation 2 will be described hereinafter as an example of the scheduling restriction condition, embodiments of the disclosure are not limited thereto.

For example, when scheduling retransmission of a specific TB, a method of applying the condition of Equation 2 only when the number of symbols L to which PDSCH used for retransmission is mapped is smaller than the number of symbols L' to which PDSCH used for initial transmission is mapped and also smaller than 7 symbols may be used. That is, this method does not apply the condition of Equation 2 when the number of symbols L to which PDSCH used for retransmission is mapped is equal to or greater than the number of symbols L' to which PDSCH used for initial transmission is mapped, or when the number of symbols L to which PDSCH used for retransmission is mapped is equal to or greater than 7 symbols.

In another example, when scheduling retransmission of a specific TB, a method of applying the condition of Equation 2 only when the number of symbols L to which PDSCH used for retransmission is mapped is smaller than a smaller value between the number of symbols L' to which PDSCH used for initial transmission is mapped and 7 may be used. That is, the condition of Equation 2 is applied only when the number of symbols L to which PDSCH used for retransmission is mapped is smaller than min(L', 7).

In this embodiment and subsequent embodiments, a demodulation reference signal (DMRS) symbol for PDSCH may also be included when calculating the number of symbols used for PDSCH mapping. That is, in order to calculate the number of such symbols, all symbols for PDSCH transmission delivered through higher signaling or the DCI indicating PDSCH mapping information may be considered. Similarly, in case of PUSCH, DMRS symbols for PUSCH may be included for calculation.

This may be a method of, in case where retransmission is performed or the IMCS value for at least one TB in the DCI is greater than a specific value (W=27 or 28), considering the scheduling restriction condition given by Equation 2 only when PDSCH for retransmission is mapped to the number of symbols to which PDSCH used for initial transmission is mapped. This may be because, in many cases, the method proposed in this embodiment can reduce the complexity of base station scheduling algorithm and implementation method, based on using the same number of symbols for initial transmission and retransmission at the base station and based on the fact that scheduling in case of a large TBS is frequently performed when it is greater than 7 symbols.

In addition to the above embodiment of applying the scheduling restriction condition (Equation 2) based on retransmission or not and the number of symbols of PDSCH, Equation 2 may be a condition applied to other cases. For example, a case where the terminal reports the capability of fast processing time, a case where a higher parameter of Capability2-PDSCH-Processing is configured, a case where processingType2Enabled in the higher parameter set of PDSCH-ServingCellConfig (or PUSCH-ServingCellConfig) is set to TRUE, Equation 2 may also be applied. In the above, what Equation 2 is applied may mean performing data transmission/reception based on scheduling only in case of the scheduling that satisfies Equation 2 by checking the condition of Equation 2.

Fourth Embodiment

The fourth embodiment relates to another method and device for performing scheduling so as not to exceed a maximum data rate of a terminal in performing data retransmission and for receiving data. In this embodiment and subsequent embodiments, data may be referred to as a TB or a transport block.

When accessing a base station, a terminal can report the capability of the terminal to the base station. The capability of the terminal may include at least one of parameters to be used for calculating the maximum data rate of the terminal, such as the maximum number of layers, the maximum modulation order, and the like that the terminal can support.

The maximum data rate of the terminal may be calculated, for example, as given in Equation 1, based on the capability of the terminal reported to the base station and parameters configured for the terminal by the base station through RRC signaling. The maximum data rate of the terminal may be determined based on the baseband processing or signal processing capability of the terminal including channel estimation, equalization, channel code decoding, multi-antenna reception, and the like. That is, what the maximum data rate of a certain terminal is high may mean that the signal processing capability of the terminal is high.

The terminal may receive downlink control information including scheduling information, identify the scheduling information, and calculate an actual instantaneous data rate therefrom by using at least one of the following methods.

From the scheduling information, the terminal may know the amount of data to be transmitted/received or the value of a TBS, and may also identify the number of symbols to which PDSCH or PUSCH is mapped.

If the actual data rate calculated based on the information scheduled for the terminal is greater than the maximum data rate of the corresponding terminal, the terminal may not be able to finish the signal processing necessary for transmitting/receiving scheduled data within a given time. Therefore, it may be necessary for the base station to perform scheduling so that the actual instantaneous data rate is smaller than the maximum data rate of the terminal. This is because, if the actual instantaneous data rate is scheduled to be greater than the maximum data rate of the terminal, the terminal cannot complete signal processing within a given time, and this means that frequency time resources are inefficiently used.

Depending on a method of calculating the actual instantaneous data rate, a scheduling and data transmission/reception method may vary. For example, a method of checking whether the actual instantaneous data rate satisfies the capability of the terminal may be calculated based on Equation 2 discussed above, for example. In Equation 2, the left side of the inequality sign may be considered as a scheduled instantaneous data rate, and the right side DataRateCC may be considered as the maximum data rate of the terminal determined according to the capability of the terminal in the corresponding serving cell.

For example, another method of checking whether the actual instantaneous data rate satisfies the capability of the terminal may be calculated based on Equation 4 discussed above. In Equation 4, the left side of the inequality sign may be considered as the instantaneous data rate transmitted from J serving cells at the scheduled moment, and the right side DataRate may be considered as the maximum data rate of the terminal configured according to the capability of the terminal in the J serving cells. The slot s_j is a slot in the serving cell j that overlaps with or includes a specific time point at which the instantaneous data rate is to be calculated.

In the above, Equation 4 may be a condition applied to all cases including initial transmission and retransmission, and Equation 2 may be a condition applied to retransmission. However, Equation 2 or 4 is only an example of a condition for limiting scheduling, and is not construed as a scope limitation of the disclosure.

In all cases where the base station schedules the retransmission of a specific TB to the terminal, if the scheduling is limited to satisfy the condition of Equation 2, there may be many cases where the retransmission cannot be scheduled. In the above, what the base station schedules retransmission of a specific TB to the terminal may mean a condition that MCS is greater than 27 in case of being configured with MCS table 2 below, or may mean a condition that MCS is greater than 28 in case of being configured with any other than MCS table 2. Detail is the same as described above.

Or, specifically, case where an IMCS value for at least one TB in the DCI is greater than a specific value (W is 27 or 28) may be assumed or considered as retransmission. In the above, the specific value for comparison with the IMCS may be determined to be 27 or 28 depending on configuration of which MCS table to use.

For example, it may be determined depending on the higher parameter mcs-Table value in the configuration related to PDSCH transmission, PUSCH transmission, or SPS transmission. As an example, the specific value may be 27 in case of being configured as 'qam256', and may be 28 in other cases.

In one example where the subcarrier spacing is 120 kHz, the frequency bandwidth is 100 MHz, two-layer transmission is used with 64QAM, and the base station initially transmits one TB to the terminal by using PDSCH via 7 symbols with MCS 26, retransmission may not be performed with the same 7 symbols. This is because a certain terminal may not be able to process scheduling that violates the condition of Equation 2.

Therefore, when retransmission is performed, cases of considering the scheduling restriction condition (e.g., Equation 2) when the base station and the terminal determine a subsequent operation may be limited to specific cases. Meanwhile, although Equation 2 will be described hereinafter as an example of the scheduling restriction condition, embodiments of the disclosure are not limited thereto.

For example, when scheduling retransmission of a specific TB, a method of applying the condition of Equation 2 only when the number of symbols L to which PDSCH used for retransmission is mapped is smaller than (L'-x) symbols with respect to the number of symbols L' to which PDSCH used for initial transmission is mapped may be used. That is, this method does not apply the condition of Equation 2 when the number of symbols L to which PDSCH used for retransmission is mapped is equal to or greater than L' minus x.

In the above, the value of x may be applied as a fixed value such as 2 or 3, but may be a value that the base station separately sets via higher signaling. For example, when the value of x is set or predetermined to 2, the condition of Equation 2 may be applied when the number of symbols L to which PDSCH used for retransmission is mapped is smaller than L'-2 with respect to the number of symbols L' to which PDSCH used for initial transmission is mapped.

In this embodiment and subsequent embodiments, a demodulation reference signal (DMRS) symbol for PDSCH may also be included when calculating the number of symbols used for PDSCH mapping. That is, in order to calculate the number of such symbols, all symbols for PDSCH transmission delivered through higher signaling or the DCI indicating PDSCH mapping information may be considered. Similarly, in case of PUSCH, DMRS symbols for PUSCH may be included for calculation.

This may be a method of, in case where retransmission is performed or the IMCS value for at least one TB in the DCI is greater than a specific value (W=27 or 28), considering the scheduling restriction condition given by Equation 2 only when PDSCH for retransmission is mapped to the number of symbols to which PDSCH used for initial transmission is mapped. This may be because, in many cases, the method proposed in this embodiment can reduce the complexity of base station scheduling algorithm and implementation method, based on using the same number of symbols or a number of symbols as small as 2 symbols for initial transmission and retransmission at the base station.

In addition to the above embodiment of applying the scheduling restriction condition (Equation 2) based on retransmission or not and the number of symbols of PDSCH, Equation 2 may be a condition applied to other cases. For example, a case where the terminal reports the capability of fast processing time, a case where a higher parameter of Capability2-PDSCH-Processing is configured, a case where processingType2Enabled in the higher parameter set of PDSCH-ServingCellConfig (or PUSCH-ServingCellConfig) is set to TRUE, Equation 2 may also be applied. In the above, what Equation 2 is applied may mean performing data transmission/reception based on scheduling only in case of the scheduling that satisfies Equation 2 by checking the condition of Equation 2.

Hereinafter, the operation of the terminal will be described.

The terminal may identify a condition for determining a subsequent operation method from DCI transmitted through PDCCH.

According to an embodiment, when initial transmission is identified from the DCI, the following condition may be used to determine a subsequent operation method.

$$\sum_{j=0}^{J-1} \frac{\sum_{m=0}^{M-1} V_{j,m}}{T_{slot}^{\mu(j)}} \le DataRate$$

According to an embodiment, when the IMCS value for at least one TB in the DCI is greater than a specific value (W=27 or 28), the instantaneous data rate condition of Equation 2 may be used to determine the subsequent operation method. In the disclosure, the instantaneous data rate condition may be used in the same meaning as the above-described scheduling restriction condition.

In the above and below embodiments, the specific value for comparison with the IMCS may be determined to be 27 or 28 depending on configuration of which MCS table to use. For example, it may be determined depending on the upper parameter mcs-Table value contained in the configuration related to PDSCH transmission, PUSCH transmission, or SPS transmission. As an example, the specific value may be 27 in case of being configured as qam256', and may be 28 in other cases.

According to an embodiment, based on the length of the symbol number (L) of the retransmission PDSCH scheduled by the DCI, and/or based on a result of comparison between the number of symbols (L) of the retransmission PDSCH and the number of symbols (L') of initial transmission PDSCH, it is possible to determine whether to use the instantaneous data rate condition of Equation 2.

According to an embodiment, if the number of symbols (L) of retransmission PDSCH scheduled by the DCI is smaller than a specific number (e.g., L<7), and if the IMCS value for at least one TB in the DCI is greater than a specific value (W=27 or 28), the instantaneous data rate condition of Equation 2 may be used to determine the subsequent operation method. If the number of symbols (L) of retransmission PDSCH is greater than or equal to the specific number (e.g., L>=7), and if the IMCS value for at least one TB in the DCI is greater than the specific value (W=27 or 28), it is possible to process the scheduled PDSCH without checking whether the instantaneous data rate condition of Equation 2 is satisfied.

According to an embodiment, if the number of symbols (L) of retransmission PDSCH scheduled by the DCI is smaller than the number of symbols (L') of initial transmission PDSCH (i.e., L<L'), and if the IMCS value for at least one TB in the DCI is greater than a specific value (W=27 or 28), the instantaneous data rate condition of Equation 2 may be used to determine the subsequent operation method. If the number of symbols (L) of retransmission PDSCH is greater than or equal to the number of symbols (L') of initial transmission PDSCH (i.e., L>=L'), and if the IMCS value for at least one TB in the DCI is greater than the specific value (W=27 or 28), it is possible to process the scheduled PDSCH without checking whether the instantaneous data rate condition of Equation 2 is satisfied.

According to an embodiment, if the number of symbols (L) of retransmission PDSCH scheduled by the DCI is smaller than a specific number (e.g., 7) and also smaller than the number of symbols (L') of initial transmission PDSCH (i.e., L<7 and L<L'), and if the IMCS value for at least one TB in the DCI is greater than a specific value (W=27 or 28), the instantaneous data rate condition of Equation 2 may be used to determine the subsequent operation method.

If the number of symbols (L) of retransmission PDSCH is greater than or equal to the specific number or is greater than or equal to the number of symbols (L') of initial transmission PDSCH (i.e., L>=7 or L>=L'), and if the IMCS value for at least one TB in the DCI is greater than a specific value (W=27 or 28), it is possible to process the scheduled PDSCH without checking whether the instantaneous data rate condition of Equation 2 is satisfied.

According to an embodiment, if the number of symbols (L) of retransmission PDSCH scheduled by the DCI is smaller than the minimum value between a specific number (e.g., 7) and the number of symbols (L') of initial transmission PDSCH (i.e., L<min(7, L')), and if the IMCS value for at least one TB in the DCI is greater than a specific value (W=27 or 28), the instantaneous data rate condition of Equation 2 may be used to determine the subsequent operation method.

If the number of symbols (L) of retransmission PDSCH is greater than or equal to the minimum value between the specific number (e.g., 7) and the number of symbols (L') of initial transmission PDSCH (i.e., L>=min(7, L')), and if the IMCS value for at least one TB in the DCI is greater than a specific value (W=27 or 28), it is possible to process the scheduled PDSCH without checking whether the instantaneous data rate condition of Equation 2 is satisfied.

According to an embodiment, if the number of symbols (L) of retransmission PDSCH scheduled by the DCI is smaller than a difference between the number of symbols (L') of initial transmission PDSCH and a specific symbol number (x) (i.e., L<L'-x), and if the IMCS value for at least one TB in the DCI is greater than a specific value (W=27 or 28), the instantaneous data rate condition of Equation 2 may be used to determine the subsequent operation method.

If the number of symbols (L) of retransmission PDSCH is greater than or equal to the difference between the number of symbols (L') of initial transmission PDSCH and a specific symbol number (x) (i.e., L>=L'-x), and if the IMCS value for at least one TB in the DCI is greater than a specific value (W=27 or 28), it is possible to process the scheduled PDSCH without checking whether the instantaneous data rate condition of Equation 2 is satisfied. The value of x may be applied as a fixed value such as 2 or 3. Alternatively, the x value may be a value that the base station separately sets via higher signaling.

According to an embodiment, in determining the number of symbols (L) of the retransmission PDSCH scheduled by the DCI, punctured symbols may be included.

According to an embodiment, in determining the number of symbols (L) of the retransmission PDSCH scheduled by DCI, punctured symbols may be excluded.

The above embodiments may also be applied to PUSCH in the same manner. The above embodiments may also be applied to a physical sidelink shared channel (PSSCH) in the same manner.

Fifth Embodiment

Figure 12:
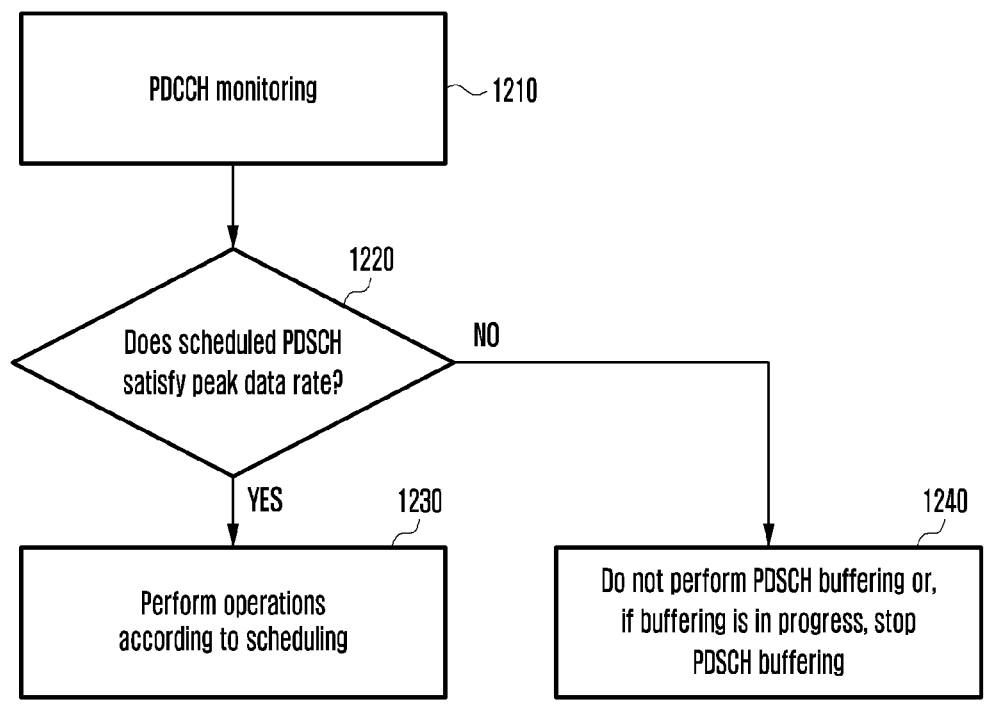
FIG. 12 is a diagram illustrating operations of a terminal for downlink reception according to an embodiment of the disclosure.

FIG. 12 is a diagram illustrating operations of a terminal for downlink reception according to an embodiment of the disclosure.

According to an embodiment, at 1210, the terminal may perform PDCCH monitoring on a predetermined resource.

The terminal may decode DCI received through PDCCH and check whether it is necessary to determine whether an instantaneous data rate condition is satisfied. If it is necessary to determine whether the instantaneous data rate condition is satisfied, the terminal may determine at 1220 whether PDSCH scheduled by the DCI satisfies the instantaneous data rate condition.

If the instantaneous data rate condition is satisfied, the terminal may perform an operation of receiving the scheduled PDSCH at 1230.

If the instantaneous data rate condition is not satisfied, the terminal may not perform the operation of receiving the scheduled PDSCH at 1240. The terminal may stop buffering the PDSCH or may not perform the PDSCH buffering operation.

Sixth Embodiment

Figure 13:
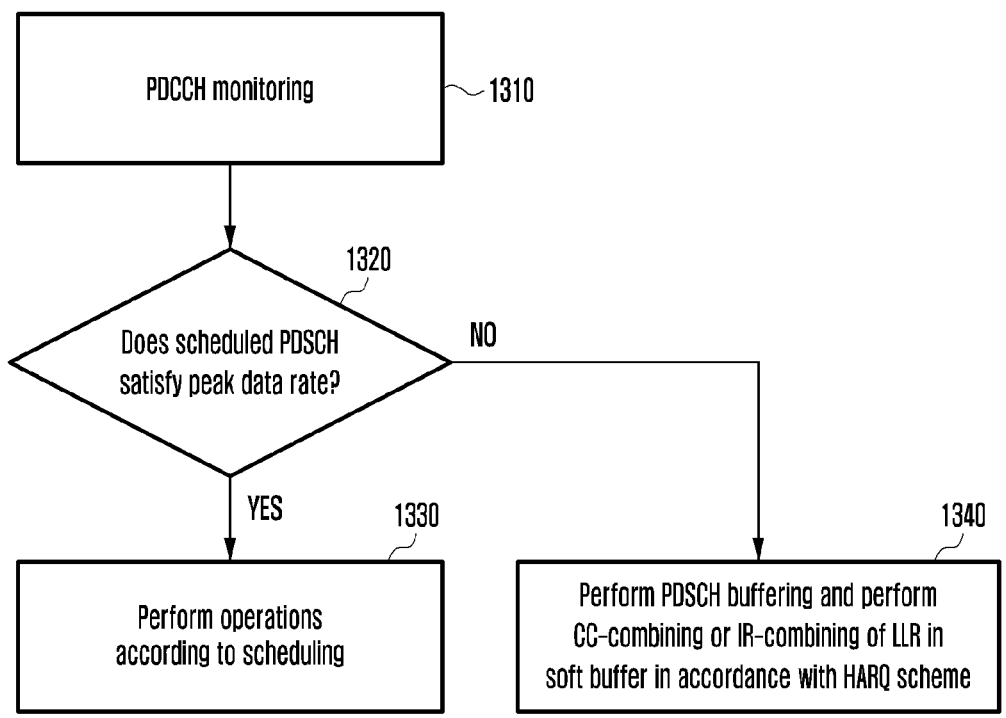
FIG. 13 is another diagram illustrating operations of a terminal for downlink reception according to an embodiment of the disclosure.

FIG. 13 is another diagram illustrating operations of a terminal for downlink reception according to an embodiment of the disclosure.

According to another embodiment, at 1310, the terminal may perform PDCCH monitoring on a predetermined resource.

The terminal may decode DCI received through PDCCH and check whether it is necessary to determine whether an instantaneous data rate condition is satisfied. If it is necessary to determine whether the instantaneous data rate condition is satisfied, the terminal may determine at 1320 whether PDSCH scheduled by the DCI satisfies the instantaneous data rate condition.

If the instantaneous data rate condition is satisfied, the terminal may perform an operation of receiving the scheduled PDSCH at 1330.

If the instantaneous data rate condition is not satisfied, the terminal may buffer the PDSCH and perform CC-combining or IR-combining of log likelihood ratio (LLR) in a soft buffer in accordance with the HARQ scheme at 1340. When the energy or SNR of the combining result satisfies a specific condition, the decoding process may be started. Alternatively, the decoding process may be started after performing the combining more than a certain number of times, that is, after receiving retransmissions more than a certain number of times.

Seventh Embodiment

Figure 14:
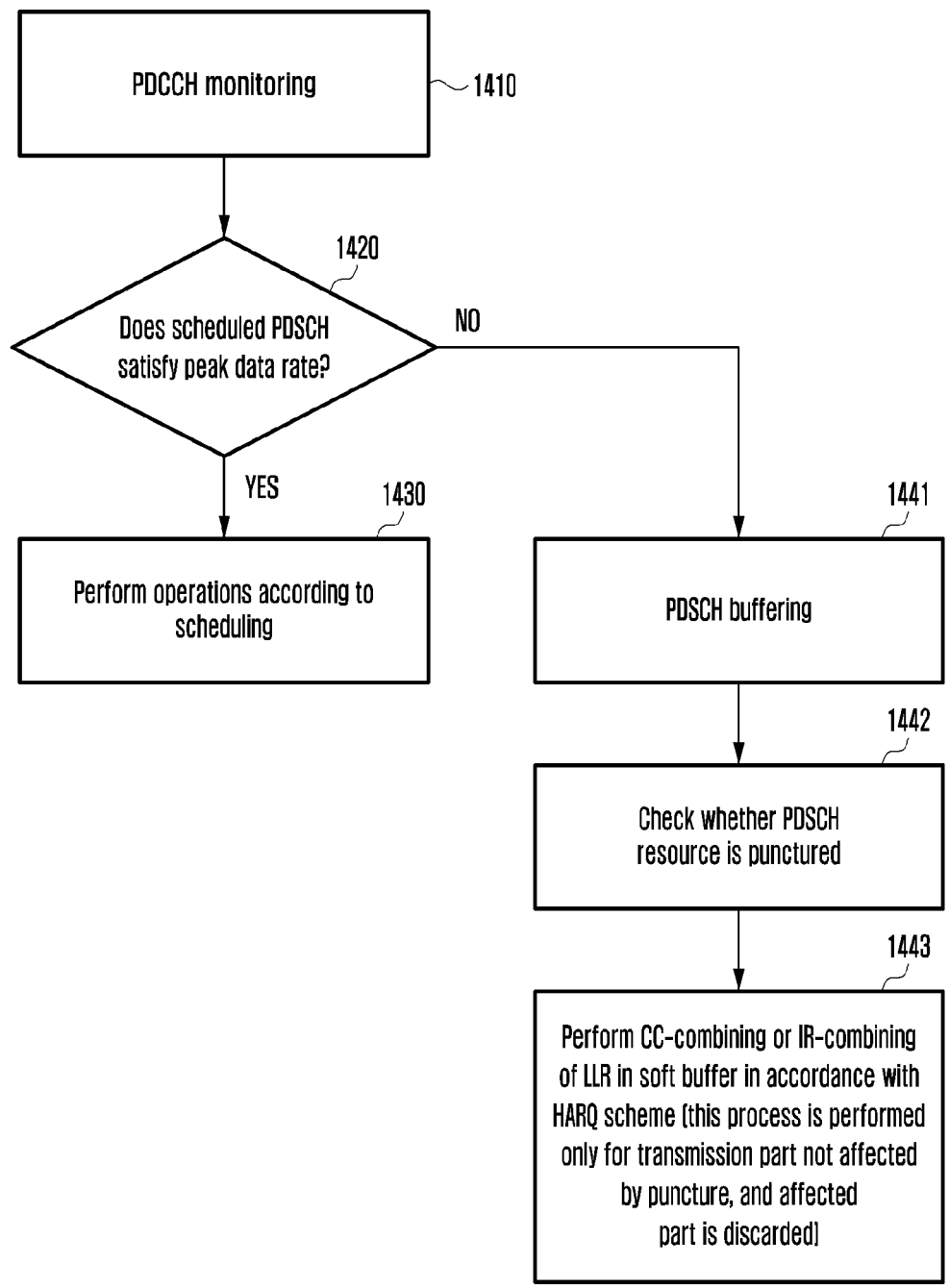
FIG. 14 is still another diagram illustrating operations of a terminal for downlink reception according to an embodiment of the disclosure.

FIG. 14 is still another diagram illustrating operations of a terminal for downlink reception according to an embodiment of the disclosure.

According to another embodiment, the terminal may perform PDCCH monitoring on a predetermined resource or a configured resource.

The terminal may decode DCI received through PDCCH and check whether it is necessary to determine whether an instantaneous data rate condition is satisfied. If it is necessary to determine whether the instantaneous data rate condition is satisfied, the terminal may determine at 1420 whether PDSCH scheduled by the DCI satisfies the instantaneous data rate condition.

If the instantaneous data rate condition is satisfied, the terminal may perform an operation of receiving the scheduled PDSCH at 1430.

If the instantaneous data rate condition is not satisfied, the terminal may buffer the PDSCH at 1441 and check at 1442 whether a PDSCH resource is punctured. For example, at least one RNTI may be configured in the terminal through RRC signaling, and a certain RNTI may be used to indicate whether a pre-allocated PDSCH resource is punctured.

When this RNTI is configured, at 1443, the terminal may perform CC-combining or IR-combining of the LLR in the soft buffer in accordance with the HARQ scheme only for a data part delivered to a non-punctured resource. When the energy or SNR of the combining result satisfies a specific condition, the decoding process may be started. Alternatively, the decoding process may be started after performing the combining more than a certain number of times, that is, after receiving retransmissions more than a certain number of times.

Eighth Embodiment

Figure 15:
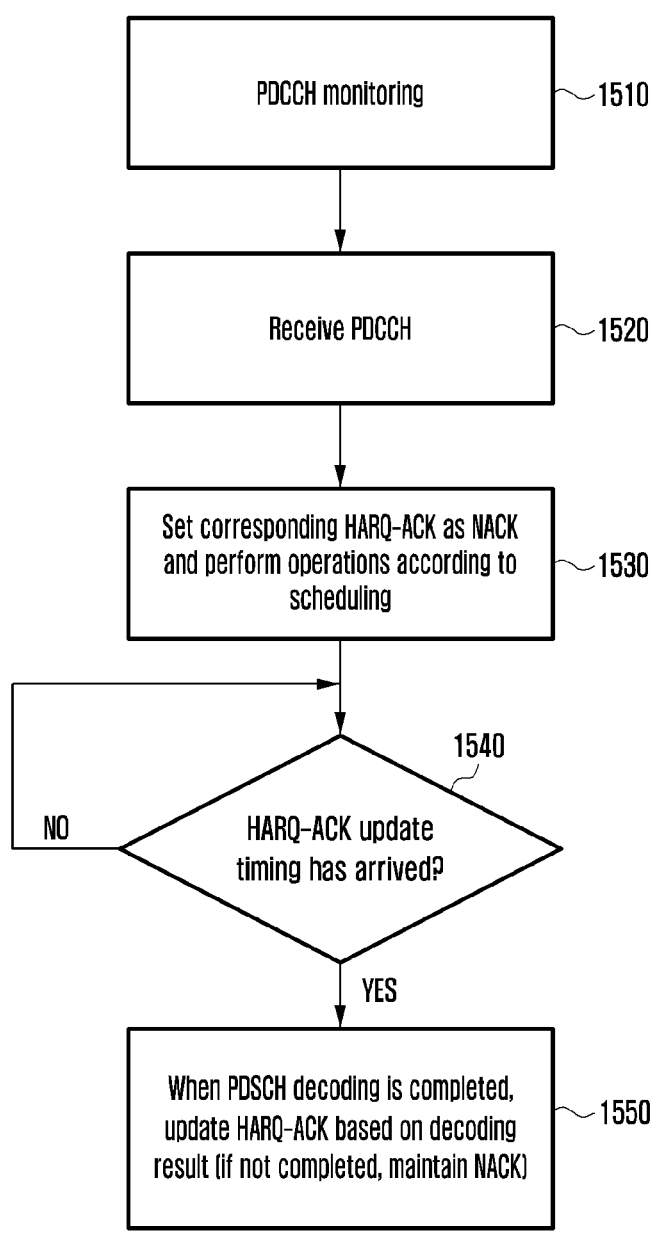
FIGS. 15 and 16 are other diagrams illustrating operations of a terminal for downlink reception according to an embodiment of the disclosure.
Figure 16:
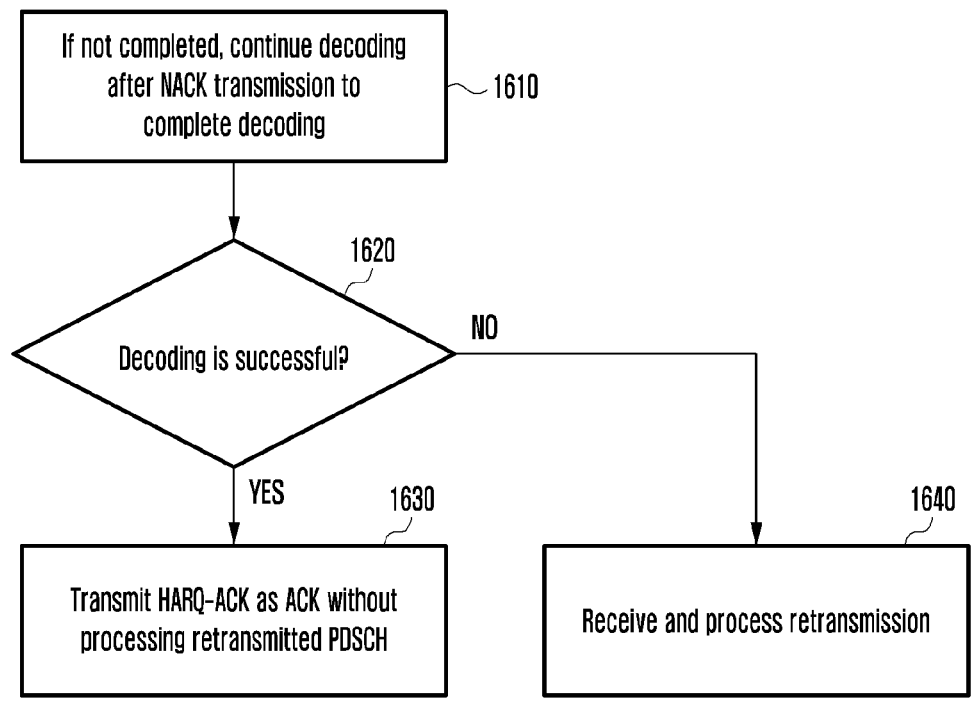

FIGS. 15 and 16 are other diagrams illustrating operations of a terminal for downlink reception according to an embodiment of the disclosure.

According to still another embodiment, at 1510, the terminal may perform PDCCH monitoring in a predetermined resource or in a configured resource. At 1520, the terminal may perform an operation of receiving PDSCH scheduled via DCI transmitted through PDCCH without performing classification based on the length of the PDSCH and/or checking whether the instantaneous data rate condition is satisfied. Also, through the DCI, the terminal may determine a resource (frequency, timing) on which HARQ-ACK information will be transmitted.

Before decoding the PDSCH, the terminal may set HARQ-ACK information corresponding to the PDSCH as NACK at 1530.

Then, at 1540, the terminal may determine whether the HARQ-ACK update timing has arrived.

When the HARQ-ACK update timing is reached, and when PDSCH decoding is completed, the terminal may update the HARQ-ACK information corresponding to a decoding result at 1550. For example, if the PDSCH decoding is successful, the terminal may update the corresponding HARQ-ACK information to ACK. If the PDSCH decoding is completed and the HARQ-ACK information is updated before HARQ-ACK information transmission timing, the updated information is transmitted as the HARQ-ACK information. If the HARQ-ACK information is not updated because the PDSCH decoding is not completed until the HARQ-ACK transmission timing, predetermined HARQ-ACK information (i.e., NACK information) may be transmitted.

Meanwhile, referring to FIG. 16, if the PDSCH decoding is not completed, the terminal may continue decoding at 1610 even though the HARQ-ACK information transmission time has passed.

At 1620, the terminal checks whether the decoding is successful. If the decoding is successful, the terminal may transmit the ACK on a newly designated HARQ-ACK information transmission resource at 1630 without processing data retransmitted by the network through the PDSCH. If the decoding is not successful, the terminal may perform CC-combining or IR-combining in accordance with the determined or designated HARQ scheme for data retransmitted by the network through the PDSCH and then continue the decoding process at 1640.

According to yet another embodiment, although not shown, the terminal may perform PDCCH monitoring on a predetermined resource or a configured resource.

The terminal may decode DCI received through PDCCH and check whether it is necessary to determine whether an instantaneous data rate condition is satisfied. If it is necessary to determine whether the instantaneous data rate condition is satisfied, the terminal may determine whether PUSCH scheduled by the DCI satisfies the instantaneous data rate condition.

If the instantaneous data rate condition is satisfied, the terminal may perform an operation of transmitting the scheduled PUSCH. If the instantaneous data rate condition is not satisfied, the terminal may not perform a preparation operation (e.g., data preparation in accordance with the HARQ scheme) for transmitting the scheduled PUSCH.

According to yet another embodiment, although not shown, the terminal may perform PDCCH monitoring in a predetermined resource or in a configured resource.

The terminal may perform a preparation operation (e.g., at least one of data preparation in accordance with the HARQ scheme, scrambling, modulation, etc.) for transmitting PUSCH scheduled via DCI transmitted through PDCCH without performing classification based on the length of the PUSCH and/or checking whether the instantaneous data rate condition is satisfied.

The terminal may determine, based on the DCI, a resource (frequency, timing) on which the PUSCH will be transmitted. If the preparation for PUSCH transmission is completed before the PUSCH transmission timing, the terminal may perform PUSCH transmission on the scheduled PUSCH resource. If not completed, the terminal may stop the PUSCH transmission preparation operation.

According to further another embodiment, although not shown, the base station may perform an operation of receiving PUSCH in a resource (frequency, timing) scheduled to the terminal via DCI transmitted through PDCCH.

The base station may perform an operation of detecting DMRS in the scheduled resource. If the DMRS is detected, the base station may perform an operation of receiving PUSCH data, and if the DMRS is not detected, the base station may not perform the operation of receiving PUSCH data.

Ninth Embodiment

Figure 17:
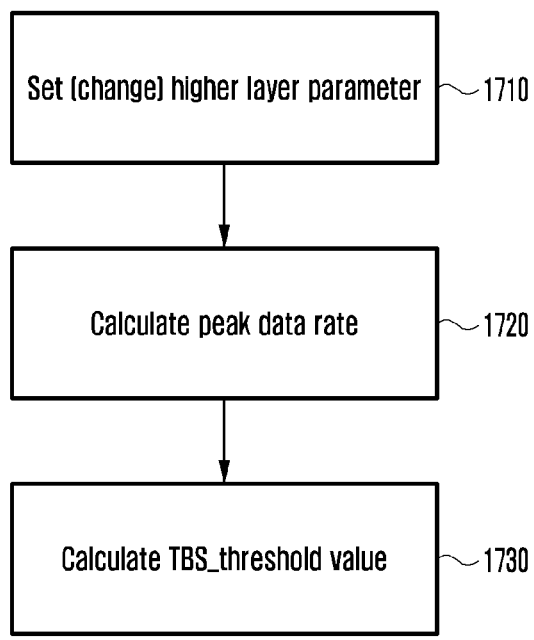
FIG. 17 is a diagram illustrating operations of a base station according to an embodiment of the disclosure.

FIG. 17 is a diagram illustrating operations of a base station according to an embodiment of the disclosure.

At 1710, the base station may determine at least one of a frequency band to be used, a bandwidth of a carrier to be used in the frequency band, and a subcarrier spacing to be used. In addition, the base station may determine higher parameters (e.g., RRC parameters) related to each of an initially accessed terminal, a newly RRC-configured terminal, a terminal in which a change of higher parameters (e.g., RRC parameters) has occurred, and a terminal in which an exchange of UE capability has occurred.

At 1720, the base station may calculate the maximum data rate for each terminal by using the above parameters and Equation 1.

In addition, at 1730, the base station may calculate a TBS_threshold value. Here, the TBS_threshold value may be calculated based on a specific resource size, for example, the number of symbols having a specific length. An example of another parameter for calculating the TBS_threshold value may be the number of symbols included in one slot.

Figure 18A:
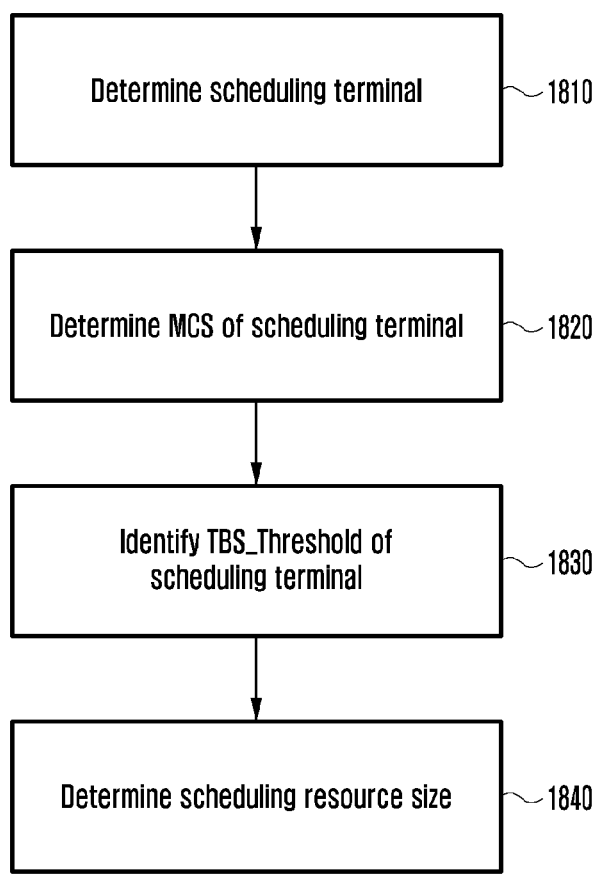
FIG. 18A is another diagram illustrating operations of a base station according to an embodiment of the disclosure.

FIG. 18A is another diagram illustrating operations of a base station according to an embodiment of the disclosure.

When scheduling for initial transmission or decoding for initial transmission fails, scheduling for retransmission may be required. In this case, the base station may determine a terminal requiring such scheduling at 1810.

Based on a channel status (CSI) of the determined terminal or the like, the base station may determine an MCS of the scheduling terminal at 1820.

In addition, the base station may identify the TBS_Threshold determined for each terminal at 1830, and may determine a scheduling resource size of the terminal based on the TBS_Threshold at 1840.

Figure 18B:
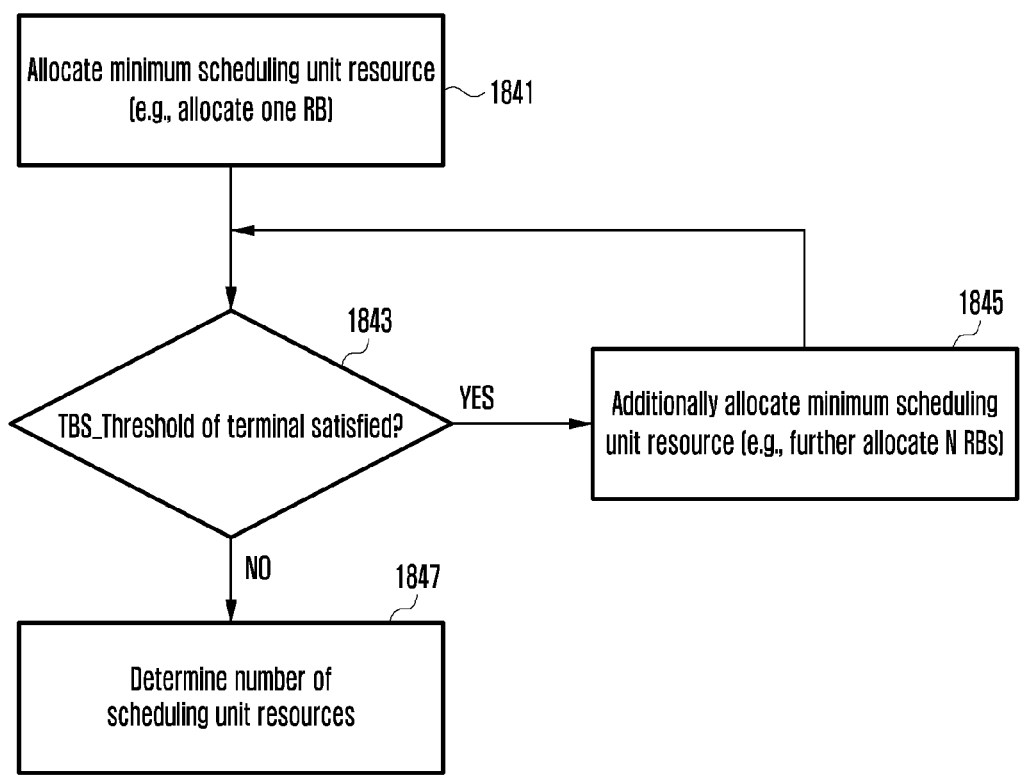
FIG. 18B is a diagram illustrating that a base station determines a scheduling resource of a terminal according to an embodiment of the disclosure.

FIG. 18B is a diagram illustrating that a base station determines a scheduling resource of a terminal according to an embodiment of the disclosure.

According to an embodiment of determining the scheduling resource of the terminal, the base station may determine the minimum scheduling unit resource at 1841. The minimum scheduling unit resource may be N (N=1, 2, 3 . . . ) RB(s).

The base station may differently apply the minimum scheduling unit resource N depending on a given situation. For example, the minimum scheduling unit resource may be one RB. The base station may compare at 1843 whether the TBS_Threshold of the terminal is satisfied while adding the minimum scheduling unit resource, for example, adding the RB one by one.

If the TBS_Threshold is satisfied, the base station may additionally allocate the minimum scheduling unit resource at 1845. If the TBS_Threshold is not satisfied, the terminal may determine the number of scheduling unit resources at 1847.

According to another embodiment of determining the scheduling resource of the terminal, the base station may calculate in advance a value for the number of minimum scheduling unit resources (a size of data that can be transmitted on the minimum scheduling unit resource) and store it in a table. Therefore, it is possible to determine the number of scheduling unit resources that satisfy the TBS_Threshold value without a need to calculate while adding scheduling unit resources.

The base station may determine whether the determined scheduling resource size is available in the corresponding slot. If available, the base station may finally determine resource allocation to the corresponding terminal and transmit the corresponding DCI to the corresponding terminal through the PDCCH. If not available, the base station may finally decide not to allocate resources in the corresponding slot to the corresponding terminal, or change to allocating only available resources to the corresponding terminal and transmit the corresponding DCI to the corresponding terminal through the PDCCH.

Although examples of PDSCH transmission have been described in the above embodiments, this may also be applied to PUSCH transmission. In this case, the base station configuration information and terminal capability information related to downlink transmission used in the above embodiments may be applied by being changed to the base station configuration information and terminal capability information related to uplink transmission.

Figure 9:
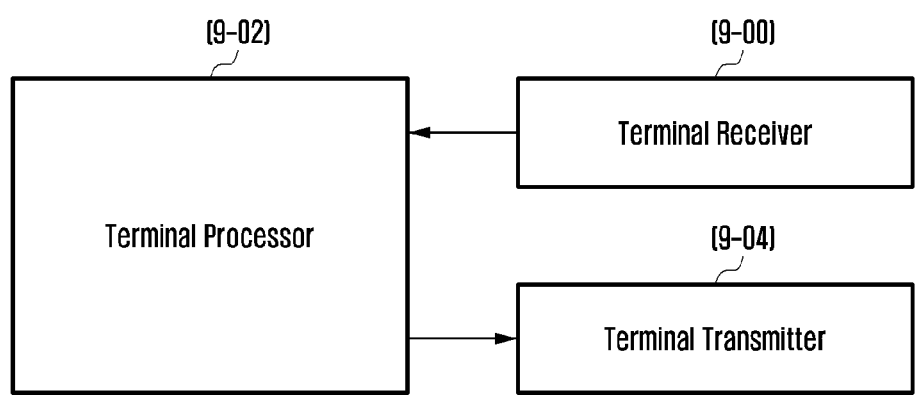
FIG. 9 is a block diagram illustrating a terminal according to an embodiment of the disclosure.
Figure 10:
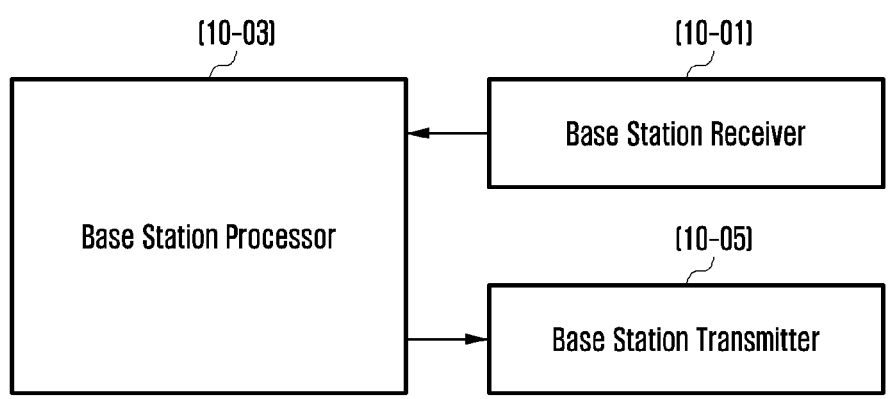
FIG. 10 is a block diagram illustrating a base station according to an embodiment of the disclosure.

A transmitter, a receiver, and a processor of a terminal and a base station for performing embodiments of the disclosure are illustrated in FIGS. 9 and 10, respectively. In order to calculate the actual data rate in the first or second embodiment and to perform the transmission/reception method, the receiver, the processor, and the transmitter of the base station and the terminal may each operate in accordance with the above-described embodiment.

FIG. 9 is a block diagram illustrating a terminal according to an embodiment of the disclosure.

As shown in FIG. 9, the terminal of the disclosure may include a terminal receiver 9-00, a terminal transmitter 9-04, and a terminal processor 9-02. The terminal receiver 9-00 and the terminal transmitter 9-04 may be collectively referred to as a transceiver in the disclosure. The transceiver may transmit and receive a signal to and from the base station. Here, the signal may include control information and data. To this end, the transceiver may include an RF transmitter for up-converting and amplifying a frequency of a transmitted signal, and an RF receiver for low-noise amplifying and down-converting a received signal.

In addition, the transceiver may receive a signal through a wireless channel, output it to the terminal processor 9-02, and transmit a signal outputted from the terminal processor 9-02 through the wireless channel. The terminal processor 9-02 may control a series of processes so that the terminal may operate in accordance with the above-described embodiment of the disclosure. For example, the terminal receiver 9-00 may receive control information and data including scheduling information for data transmission from the base station, and the terminal processor 9-02 may determine whether to perform decoding and transmission by comparing a peak data rate of the terminal and the scheduled data amount, and perform signal processing accordingly. Thereafter, the terminal transmitter 9-04 may transmit, to the base station, signals that need to be transmitted.

FIG. 10 is a block diagram illustrating a base station according to an embodiment of the disclosure.

As shown in FIG. 10, the base station of the disclosure may include a base station receiver 10-01, a base station transmitter 10-05, and a base station processor 10-03. The base station receiver 10-01 and the base station transmitter 10-05 may be collectively referred to as a transceiver in the disclosure. The transceiver may transmit and receive a signal to and from the terminal. Here, the signal may include control information and data. To this end, the transceiver may include an RF transmitter for up-converting and amplifying a frequency of a transmitted signal, and an RF receiver for low-noise amplifying and down-converting a received signal. In addition, the transceiver may receive a signal through a wireless channel, output it to the base station processor 10-03, and transmit a signal outputted from the base station processor 10-03 through the wireless channel.

The base station processor 10-03 may control a series of processes so that the base station may operate in accordance with the above-described embodiment of the disclosure.

Figure 8:
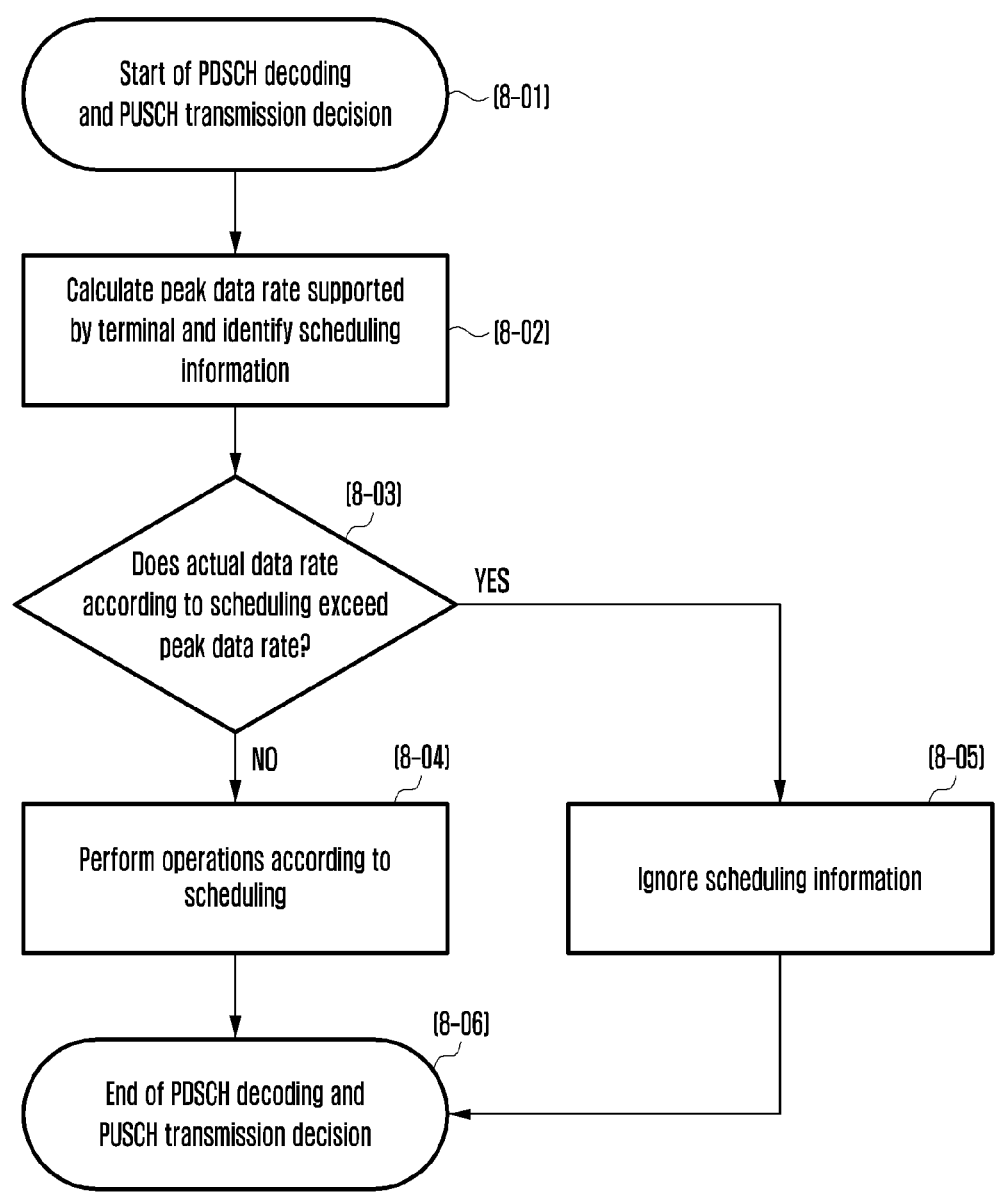
FIG. 8 is a flow diagram illustrating a method of a terminal for determining whether to perform PDSCH decoding and PUSCH transmission according to an embodiment of the disclosure.

For example, the base station may operate in accordance with flowchart disclosed in FIG. 8. In addition, the base station or the base station processor 10-03 may control a series of processes to perform the operations disclosed in FIG. 8.

The base station or the base station processor 10-03 may start a PDSCH decoding and a PUSCH transmission decision (8-01).

The base station or the base station processor 10-03 may calculate a peak data rate supported by the terminal and identify scheduling information (8-02).

The base station or the base station processor 10-03 may determine whether a actual data rate according to the scheduling exceeds peak data rate (8-03). In case that the actual data rate according to the scheduling does not exceed the peak data rate, the base station or the base station processor 10-03 may perform operations according to the scheduling (8-04). In case that the actual data rate according to the scheduling exceeds the peak data rate, the base station or the base station processor 10-03 may ignore the scheduling information (8-05).

The base station or the base station processor 10-03 may end the PDSCH decoding and the PUSCH transmission decision (8-06).

For example, the base station processor 10-03 may calculate a peak data rate of the terminal, determine a TBS in a range not exceeding the peak data rate, perform scheduling, and generate control information.

Thereafter, the base station transmitter 10-05 may transmit the generated control information, and the base station receiver 10-01 may receive a feedback or an uplink data signal from the terminal.

According to the disclosure for solving the above-discussed problems, a method of a terminal in a wireless communication system includes monitoring a physical downlink control channel (PDCCH), identifying whether a determination on a scheduling restriction condition is necessary, based on downlink control information (DCI) decoded as a result of the monitoring, in case that the determination on the scheduling restriction condition is necessary, identifying whether a physical downlink shared channel (PDSCH) scheduled through the DCI satisfies the scheduling restriction condition, and in case that the scheduling restriction condition is satisfied, receiving data from a base station through the PDSCH.

According to the disclosure for solving the above-discussed problems, a terminal includes a transceiver and a controller configured to monitor a physical downlink control channel (PDCCH), to identify whether a determination on a scheduling restriction condition is necessary, based on downlink control information (DCI) decoded as a result of the monitoring, to, in case that the determination on the scheduling restriction condition is necessary, identify whether a physical downlink shared channel (PDSCH) scheduled through the DCI satisfies the scheduling restriction condition, and to, in case that the scheduling restriction condition is satisfied, receive data from a base station through the PDSCH.

Meanwhile, in the drawings illustrating the method of the disclosure, the order of illustration does not necessarily correspond to the order of execution, and illustrated operations may be reordered or executed in parallel.

In addition, in the drawings illustrating the method of the disclosure, some components may be omitted with only some components leaved within a range that does not impair the subject matter of the disclosure.

In addition, the method of the disclosure may be implemented in combination with some or all of the contents contained in each embodiment within a range that does not impair the subject matter of the disclosure.

Embodiments of the disclosure and the accompanying drawings are only examples presented in order to easily describe the disclosure and facilitate comprehension of the disclosure, but are not intended to limit the scope of the disclosure. That is, it is apparent to a person skilled in the art that other modifications based on technical ideas of the disclosure can be implemented. In addition, the above-described embodiments may be used in combination with each other as needed. For example, it may be possible to apply the first embodiment and the second embodiment in combination, or to apply a part of the first embodiment and a part of the second embodiment in combination. In addition, the above embodiments and their modifications may be implemented in the LTE system, the 5G system, and the like.

The invention claimed is:

1. A method of a terminal in a wireless communication system, the method comprising:
   monitoring a physical downlink control channel (PDCCH);
   identifying whether to determine for a scheduling restriction condition based on downlink control information (DCI) decoded as a result of the monitoring;
   in case that the determining for the scheduling restriction condition is necessary, identifying whether a physical downlink shared channel (PDSCH) scheduled through the DCI satisfies the scheduling restriction condition; and
   in case that the scheduling restriction condition is satisfied, receiving, from a base station, data through the PDSCH.

2. The method of claim 1, further comprising:
   in case that the scheduling restriction condition is not satisfied,
   stopping buffering of the data received through the PDSCH.

3. The method of claim 1, wherein the determining for the scheduling restriction condition is necessary in case that the PDSCH is for retransmission and a number of symbols of the PDSCH is smaller than a predetermined number.

4. The method of claim 1, wherein the determining for the scheduling restriction condition is necessary in case that the PDSCH is for retransmission and a number of symbols of the PDSCH is smaller than a number of symbols of PDSCH used in an initial transmission.

5. The method of claim 1, wherein the determining for the scheduling restriction condition is necessary in case that the PDSCH is for retransmission and a number of symbols of the PDSCH is smaller than a difference between a number of symbols of PDSCH used in an initial transmission and a specific value, and
   wherein the specific value is a predetermined value or a value configured from the base station.

6. The method of claim 1, wherein the scheduling restriction condition is satisfied in case that an instantaneous data rate for the PDSCH through the DCI is less than a maximum data rate for a serving cell of the terminal.

7. The method of claim 1, further comprising:
   in case that the scheduling restriction condition is not satisfied, buffering the data received through the PDSCH and combining a log likelihood ratio (LLR) value.

8. A terminal in a wireless communication system, the terminal comprising:
   a transceiver; and
   a controller configured to:
   monitor a physical downlink control channel (PDCCH),
   identify whether to determine for a scheduling restriction condition is necessary, based on downlink control information (DCI) decoded as a result of the monitoring,
   in case that the determining for the scheduling restriction condition is necessary, identify whether a physical downlink shared channel (PDSCH) scheduled through the DCI satisfies the scheduling restriction condition, and
   in case that the scheduling restriction condition is satisfied, receive, from a base station, data through the PDSCH.

9. The terminal of claim 8, wherein the controller is configured to stop buffering of the data received through the PDSCH in case that the scheduling restriction condition is not satisfied.

10. The terminal of claim 8, wherein the determining for the scheduling restriction condition is necessary in case that the PDSCH is for retransmission and a number of symbols of the PDSCH is smaller than a predetermined number.

11. The terminal of claim 8, wherein the determining for the scheduling restriction condition is necessary in case that the PDSCH is for retransmission and a number of symbols of the PDSCH is smaller than a number of symbols of PDSCH used in an initial transmission.

12. The terminal of claim 8, wherein the determining for the scheduling restriction condition is necessary in case that the PDSCH is for retransmission and a number of symbols of the PDSCH is smaller than a difference between a number of symbols of PDSCH used in an initial transmission and a specific value, and wherein the specific value is a predetermined value or a value configured from the base station.

13. The terminal of claim 8, wherein the scheduling restriction condition is satisfied in case that an instantaneous data rate for the PDSCH through the DCI is less than a maximum data rate for a serving cell of the terminal.

14. The terminal of claim 8, wherein the controller is configured to buffer the data received through the PDSCH and combine a log likelihood ratio (LLR) value in case that the scheduling restriction condition is not satisfied.

* * * * *